US007587757B2

(12) United States Patent
Scoggins et al.

(10) Patent No.: US 7,587,757 B2
(45) Date of Patent: Sep. 8, 2009

(54) SURVEILLANCE IMPLEMENTATION IN MANAGED VOP NETWORKS

(75) Inventors: Shwu-Yan Chang Scoggins, Herndon, VA (US); Debbie E. Greenstreet, Fairfax, VA (US)

(73) Assignee: Texas Instruments Incorporated, Dallas, TX (US)

( * ) Notice: Subject to any disclaimer, the term of this patent is extended or adjusted under 35 U.S.C. 154(b) by 862 days.

(21) Appl. No.: 11/054,969

(22) Filed: Feb. 10, 2005

(65) Prior Publication Data

US 2005/0174937 A1 Aug. 11, 2005

Related U.S. Application Data

(60) Provisional application No. 60/543,755, filed on Feb. 11, 2004, provisional application No. 60/545,549, filed on Feb. 18, 2004, provisional application No. 60/624,668, filed on Nov. 3, 2004, provisional application No. 60/626,595, filed on Nov. 10, 2004.

(51) Int. Cl.
*G06F 9/00* (2006.01)
(52) U.S. Cl. .......................... 726/11; 370/230
(58) Field of Classification Search ................ 713/151, 713/153, 154, 162, 168; 709/223–225; 726/11, 726/22; 370/230
See application file for complete search history.

(56) References Cited

U.S. PATENT DOCUMENTS 6,560,224 B1* 5/2003 Kung et al. .................. 370/356
6,839,323 B1* 1/2005 Foti ............................ 370/235
7,027,398 B2* 4/2006 Fang ........................... 370/235
7,436,835 B2* 10/2008 Castleberry et al. .......... 370/392
7,535,993 B2* 5/2009 Cai et al. ....................... 379/45
2002/0051518 A1* 5/2002 Bondy et al. .................. 379/35
2004/0165709 A1* 8/2004 Pence et al. ............. 379/201.01
2004/0168050 A1* 8/2004 Desrochers et al. ........... 713/153
2004/0215770 A1* 10/2004 Maher et al. ................. 709/224
2006/0227962 A1* 10/2006 Dammrose ............. 379/265.02

* cited by examiner

*Primary Examiner*—Beemnet W Dada
(74) *Attorney, Agent, or Firm*—Steven A. Shaw; W. James Brady; Frederick J. Telecky, Jr.

(57) ABSTRACT

A procedure for accomplishing surveillance within a managed VoP network when end-user encryption/decryption and NAT are in place. The procedure comprises first analyzing the network from call signaling and message standpoints, leading to the identification of suitable surveillance access points (SAPs) for packet interception. A Delivery Function (DF) facilitated by the network service provider provides the means to intercept (without alteration) and replicate packets transmitted across the SAPs. The packets are then transmitted via the DF for collection within a Collection Function (CF), which is managed by a Law Enforcement Agency (LEA), for analysis by the LEA. This analysis provides, among other benefits, the opportunity to decrypt the intercepted packets and to identify additional suitable SAPs. In demonstrating the procedure, several embodiments of network surveillance models are described. Each one identifies the location of SAPs for that model. In each model, different information is collected and different processes are followed.

20 Claims, 19 Drawing Sheets

Where to place the SAPs In VoIP Architecture?

CALEA in PSTN w/ SAP @ Tandem Switch

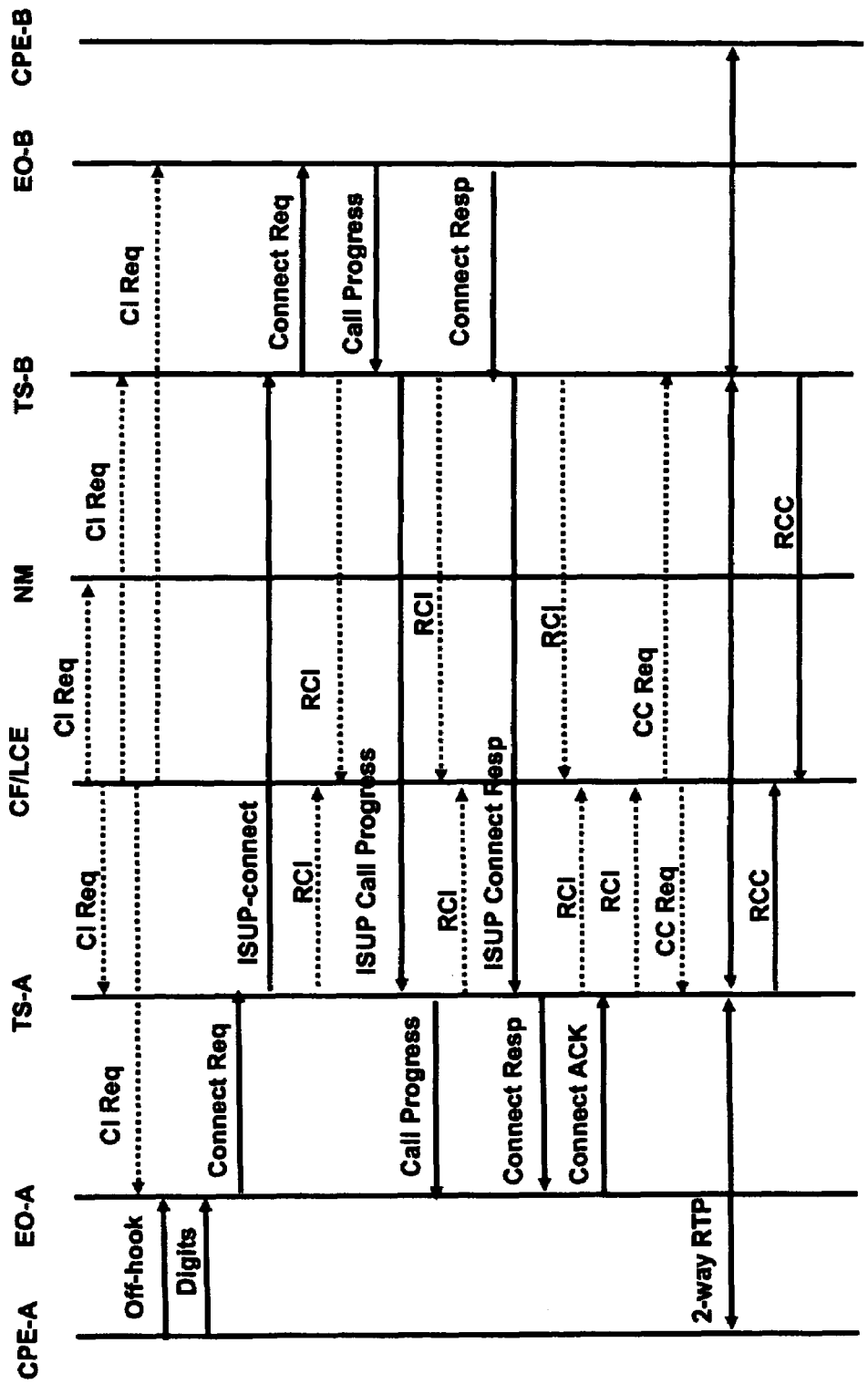
Figure 1B  PSTN CALEA Call Flow

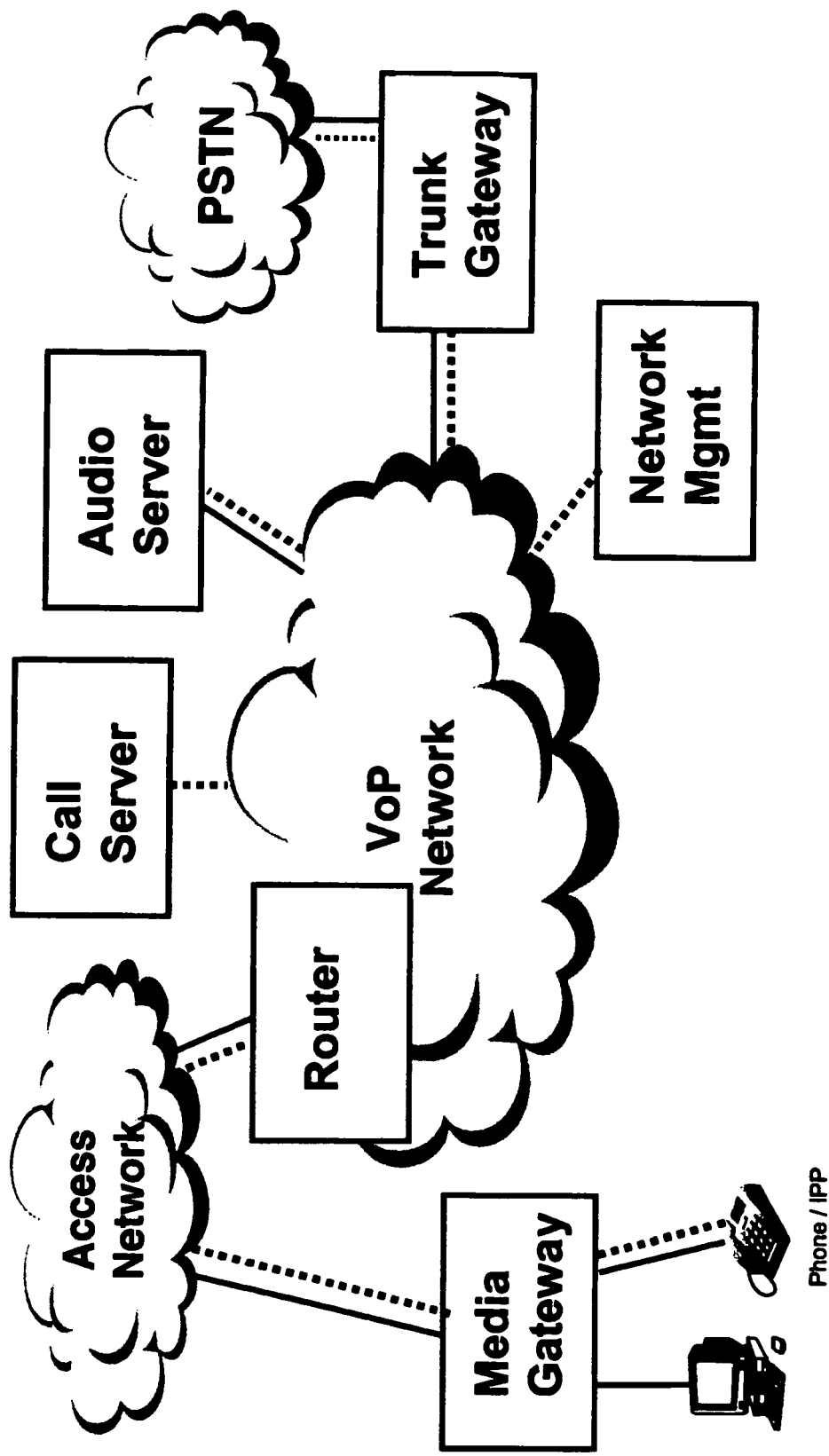

PacketCable's CALEA Implementation

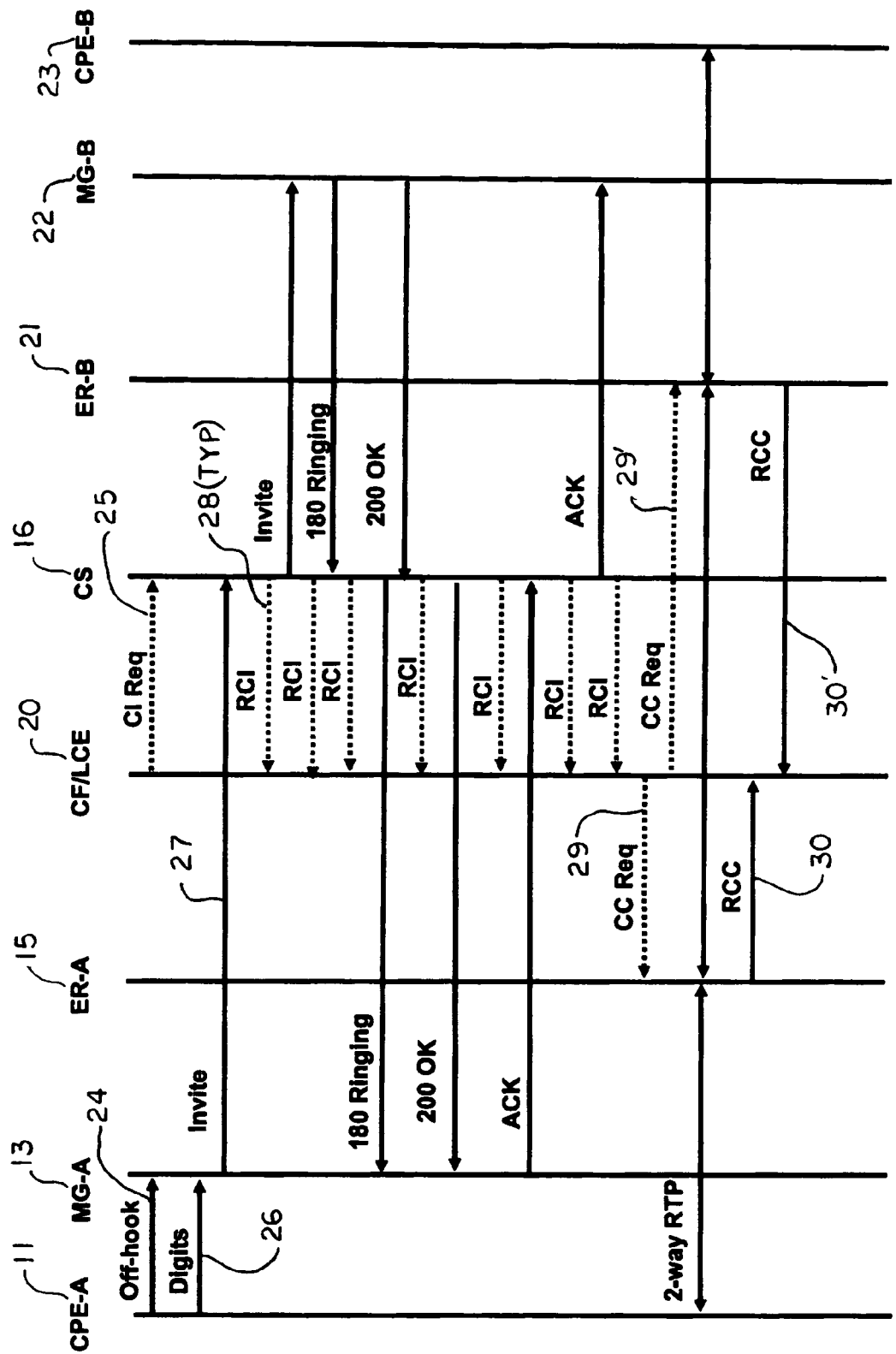
VoIP CALEA Model 1 Call Flow    Figure 4B

CS and CMGW are the SAPs
VoIP CALEA Model 2

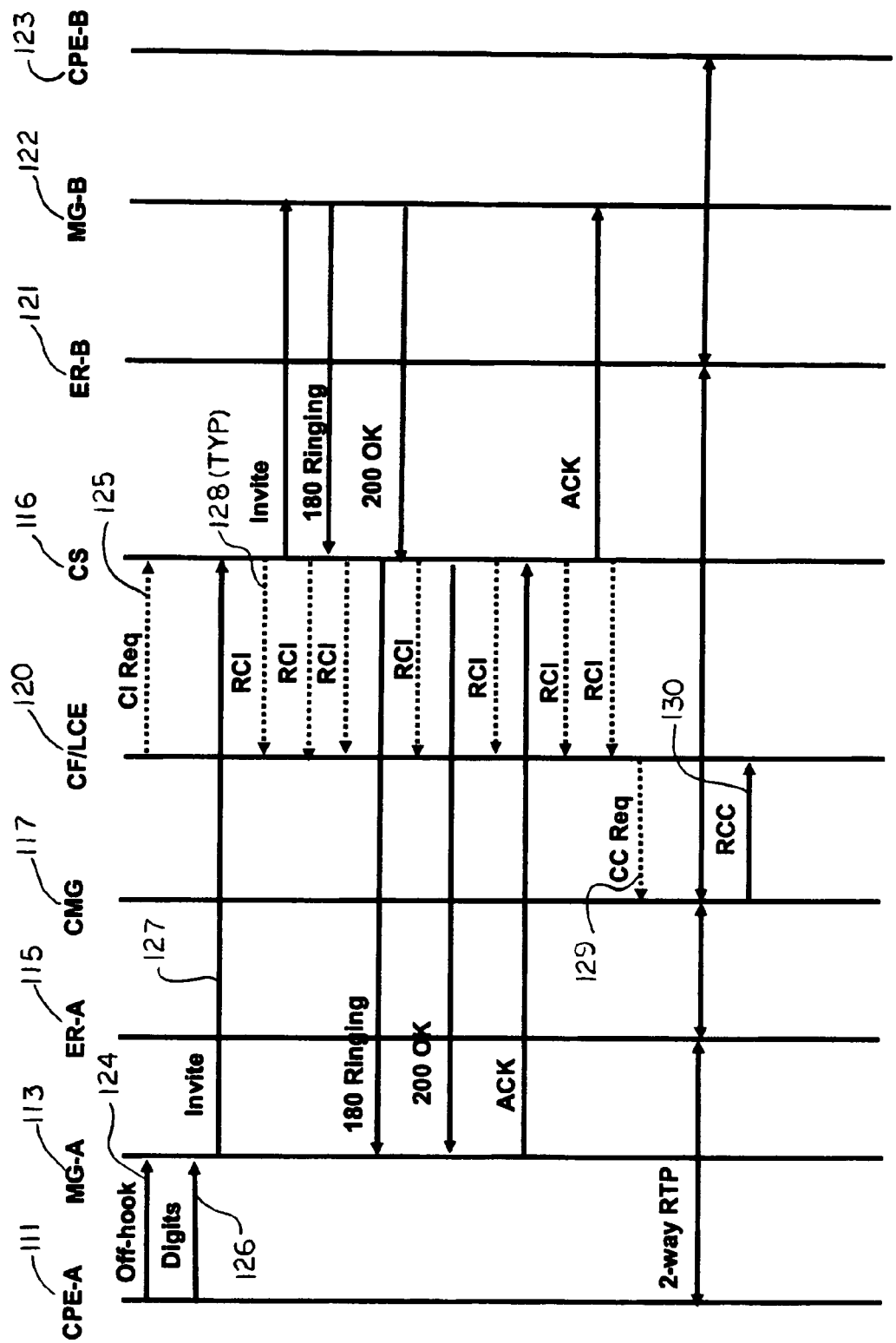
Figure 5B  VoIP CALEA Model 2 Call Flow

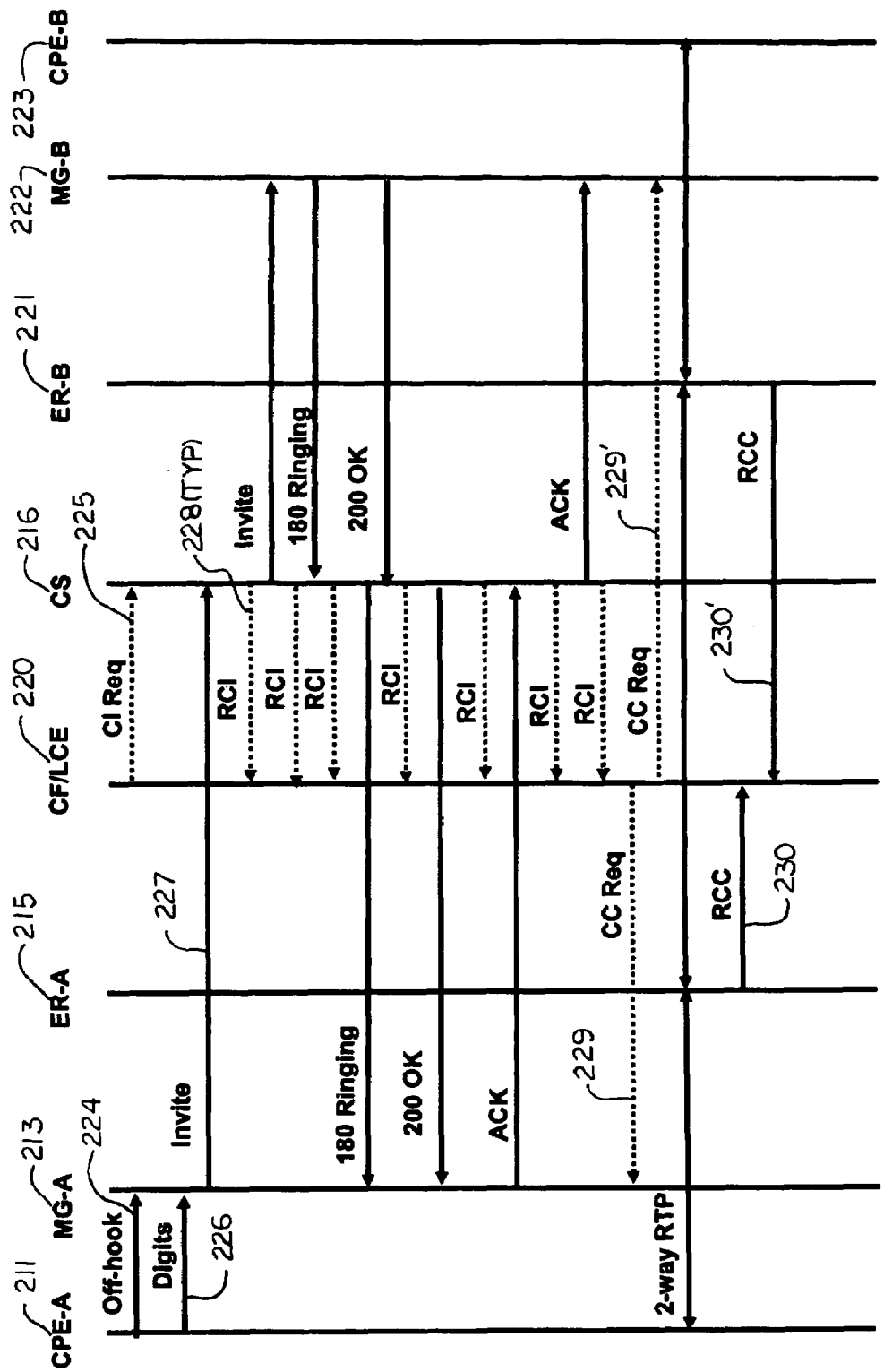
Figure 6B  VoIP CALEA Model 3 Call Flow

CS and TGW are the SAPs
VoIP CALEA Model 4

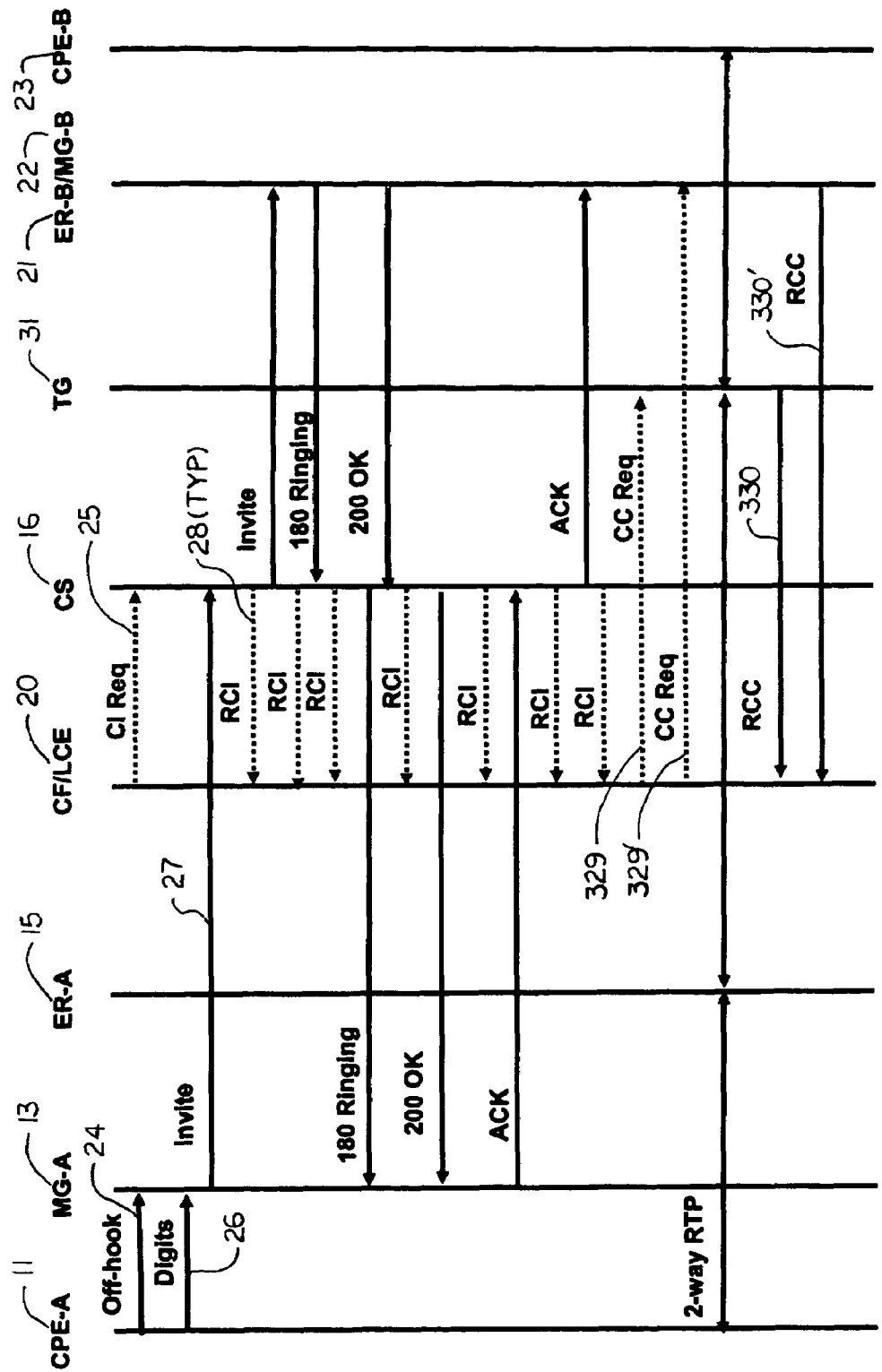
Figure 7B   VoIP CALEA Model 4 Call Flow

SIP IPP and Router are SAPs
VoIP CALEA Model 5
(Peer – to – Peer Communication)

VoIP CALEA Model 5 Call Flow

Direct Feed from ISP
FCC CALEA Model 1

Feed Via Mediation Device
FCC CALEA Model 2

Feed Via External System
FCC CALEA Model 3

SURVEILLANCE IMPLEMENTATION IN MANAGED VOP NETWORKS

CROSS-REFERENCE TO RELATED APPLICATIONS

This application claims the benefit of the following Provisional applications, all of which are pending: 60/543,755 filed Feb. 11, 2004; 60/545,549 filed Feb. 18, 2004; 60/624,668 filed Nov. 03, 2004; and 60/626,595 filed Nov. 10, 2004.

STATEMENT REGARDING FEDERALLY SPONSORED RESEARCH OR DEVELOPMENT

Not applicable.

FIELD OF THE INVENTION

The present invention relates to the field of electronic surveillance for law enforcement agency purposes under the Communications Assistance for Law Enforcement Act (CALEA). More specifically, the present invention is a method to assist in the surveillance of voice-over-packet (VOP) networks as required by the Act, particularly when end-to-end encryption/decryption and network address translation (NAT) are in place on a network.

BACKGROUND OF THE INVENTION

The Communications Assistance for Law Enforcement Act (CALEA) requires that communications networks provide means to support electronic surveillance of communications traffic. For example, Surveillance is accomplished in a PSTN network because all traffic in a PSTN must flow from a class 5 switch and must flow through the Local Exchange Carrier, with a known origination and destination.

The goals of security services are to provide privacy, packets integrity, authentication, and non-repudiation. Privacy means nobody else is intercepting your packets; packets integrity means the packets have not been modified; authentication means that the person involved in the communication is who claimed to be; and non-repudiation means the message sent and received cannot be denied. Packets can be data, voice, signals, video, image, or in any other format.

CALEA is another term for electronic surveillance. It means that the legal enforcement agent taps into a communication channel to obtain, but not alter, the packets. The FCC enacted CALEA in October 1994. Later in December 1997, the Telecom Industry Association (TIA) developed J-STD-025 (J-Standard) to include wireline, cellular, and broadband Personal Communication Services (PCS) carrier and manufactures. The FCC ruled on Aug. 26, 1999 that packet communications interception is required by Sep. 30, 2001. On Aug. 9, 2004, FCC published a Notice of Proposed Rulemaking (NPRM) wherein wireless, wireline broadband internet access service, and managed VoIP are subject to CALEA. It specifies that wireless, wireline broadband internet access, and managed VoIP are covered within the scope of "Telecommunication Carrier".

CALEA and security have conflicting objectives. In a secured network, CALEA should not function, and yet, the United States TIA requires service providers for Public Switched Telephone Networks (PSTN) and packet networks to provide means to support CALEA. All PSTNs have been supporting CALEA, but support for CALEA in a Voice over Packet (VoP) network has not been fully implemented because there are still many unresolved issues, discussed below, which exist prior to the present invention.

A security mechanism starts with establishing a Security Association (SA) between two endpoints. Establishment of a SA requires two steps.

(i) The first step is to authenticate both end-points.
(ii) The second step is to exchange security keys for encryption and decryption.

After an SA is established, both end-points encrypt and decrypt the packets using the security keys. Between the two end-points, there are many other devices in the path. If there is at least one device in the path involved in SA establishment, then the SA is in a "transport" mode. The involved intermediate device is called a Security Gateway (SGW). A SGW has and issues the security keys to encrypt and decrypt packets from both end-points. The end-points do not encrypt or decrypt the packets. Law enforcement has access to the SGW through the service provider's network.

An example of a PSTN CALEA implementation is illustrated in FIGS. 1A and 1B. FIG. 1A is a functional block diagram of a PSTN implemented CALEA architecture. FIG. 1B shows the call flow of the PSTN CALEA model. All call flows are based on SIP. The Law Enforcement Agency (LEA) needs the service provider to provision the network management device and the class 5 switch to cooperate with the Lawful Collection Equipment (LCE). The class 5 switch will direct targeted calls to a specified tandem switch (class 3 or 4 switch) located within the domain of an inter-exchange carrier (IEC). This is true even for the case that both the originator and terminator are on the same class 5 switch. This minimizes the need for modifying every class 5 switch to support CALEA. The tandem switch is the SAP in this circumstance. The PSTN CALEA model is centralized.

The Federal Communications Commission (FCC) also requires that managed Voice Over Packet (VOP), as well as Broadband Internet Access, and Wireless Internet Access, are subject to the Communications Assistance for Law Enforcement Act (CALEA). However, there are no technical guidelines defined by the FCC for implementation of CALEA in these new areas. There is little literature on the implementation of CALEA and many unanswered questions on the feasibility of supporting CALEA in VOP products. CALEA only requires the service provider (SP) to deliver intercepted packets. The SP is not required to provide decryption of the intercepted packets.

Packet network service providers, among others, are required to comply with CALEA and provide means to support electronic surveillance of traffic in their networks. A publication entitled "Packet Cable Electronic Surveillance Specification" has been adopted by the Federal Bureau of Investigation as the governing specification for the required support means.

Compliance with the Packet Cable specification is defined in terms of supporting electronic surveillance via a variety of data interception, delivery and collection functions on networks operating in what is known as "transport mode." In transport mode, Security Associations (SA) established between at least one type of security gateway (SGW) in a network and either another SGW or an end-user device attached to that network. The SGW is typically a device within a cable modem termination system (CMTS) which performs encryption and decryption of user messages, including creation and storage of the encryption keys facilitating the secure communications between the two points on the network. Compliance with the Cable Packet specification involves enabling the establishment of surveillance links between law enforcement controlled surveillance intercept boxes and the security gateways on the provider's network.

The Packet Cable security specification defines security only in a transport mode, while many broadband VPN's run on a tunnel mode. This presents some new challenges in security for electronic surveillance. Furthermore, the Packet-Cable Electronic Surveillance Specification defines the security model starting from the Cable Modem Terminal System (CMTS), while many VPN's start encryption at the end devices (PC's or IP phones) that are attached to the Multimedia Terminal Adaptor/Cable Modem (MTA/CM) and tunnel through the CMTS and/or Media Gateway (MG). Only those end devices know the security keys and associated parameters. Secured RTP (SRTP), providing end-to-end encryption for voice, is yet another concern. Not only is encryption/decryption is a challenge, but also it is difficult to intercept the message in some cases, such as in the presence of network address translation NAT.

An example of a VOP packet network is illustrated in FIG. 2. The class 5 switch of a PSTN is roughly equivalent to a Media Gateway (MGW) and a Call Server (CS). There is no central PSTN to provision switching.

Surveillance in VOP can be accomplished in a variety of ways under the specification. For example, as shown in FIG. 3, when the provider is a cable network, the surveillance "delivery function" (DF) of the Packet Cable specification is required to take place within the domain of the service provider's administration (SPA), as an adjunct to the operation of the CMTS, i.e., tapping into the system to create a surveillance access point (SAP) for law enforcement interception of call-identifying information, encrypted packet messages and the provider's encryption keys. This takes place upstream of user-controlled multimedia terminal adaptor and cable modems (MTA/CM) and Media Gateways (MGW).

The surveillance collector function (CF) resides within the domain of the law enforcement agency. The CF collects call transmissions intercepted by the DF and passes them to the law enforcement agency for monitoring and review. The CF is administered and controlled by the Law Enforcement Administrative function within the Law enforcement facility. This model of network provider support for CALEA, among others, is described in detail in the Packet Cable specification. This model works well only when the encryption functions are within the domain of the service provider. Other aspects of the CALEA surveillance model include intercepting call-identifying data through the provider's call management system (CMS) and intercepting call content at the trunk gateway (TGW) for calls redirected to the public switched telephone network (PSTN).

Unfortunately, there is a problem in complying with the specification from the standpoint of evolving technology because transport mode is not the only packet communication mode used in VOP networks. VOP networks also employ "tunnel mode" where messages are encrypted within the end user's domain and simply pass (tunnel) through the provider's gateways and network. This end-to-end tunneling necessitates finding solutions which, while they will not comply exactly with the techniques of the surveillance specification, will comply with the intent of the Act.

Clarifying the packet transmission modes, we have:

(a) TRANSPORT MODE:

In a transport mode, the SGW can support the CALEA by providing encryption security keys to the CF intercepting box which is operated by the law enforcement agency.

(b) TUNNEL MODE:

If no devices, other than the end-user devices, take part in security association establishment, then the SA is running in a tunnel mode. In this case, only the two end-points have the keys for encryption and decryption. The law enforcement agent can still intercept the packets, but they won't be able to decrypt the packets without the security keys. This means that a network operating in a tunnel mode network cannot support CALEA without employing the present invention.

Finding solutions for facilitating surveillance of VOP networks operating in tunnel mode presents many challenges. For example, as stated above, in transport mode, the provider-controlled security gateways, which are typically external to the end-user's physically controllable property, typically perform the functions of encryption and decryption for users of the network. These SGW's usually reside within a TGW, facilitating access to the PSTN, or within the CMTS in cable operator networks. The SGWs use provider-controlled encryption keys to encrypt information between connections. Since the security association is established via a service provider's gateways, the provider may configure the gateways such that both the encrypted message and the encryption key may be intercepted at those devices and sent to the law enforcement agency CF boxes whereupon the message may be decrypted and read by the agency.

In contrast however, when a packet network user operates in tunnel mode, encryption and decryption may be performed internal to an end-user's facility, typically at the subscriber's multimedia terminal adaptor or cable modem (MTA/CM), or at a residential enterprise media gateway (MGW) both of which are downstream of the CMTS and reside on customer provided equipment (CPE). Security associations (SA) thus occur external to the service provider's domain. This means that, while the service provider may still enable the law enforcement agency to intercept an encrypted message, it will not have access to the end user's encryption key. Although law enforcement code-breaking may eventually achieve results, a tunnel mode network will not support CALEA in the manner that a transport mode will, as currently provided for in the Packet Cable specification.

In addition to dealing with encryption beginning downstream from a CMTS, when network address translation (NAT) is operating within the end-user's domain, the situation becomes even more complicated. The service provider equipment is not able to determine the particular user within a end-user facility that is sending the packets on the common IP address of the end-user's facility. This is particularly difficult when a large number of users on a LAN are using a common access point to the Internet. This inability to identify an individual user presents an obstacle to law enforcement which may only seek to monitor a single user within an enterprise.

NAT provides a translation of private e-mail addresses (e.g. inside a corporate LAN) into public addresses in situations where an entity's network users outnumber the quantity of public addresses provided to that entity by its service provider (SP). Usually, the NAT function is performed on CPE prior to the message being received by the CMTS. In this case, a law enforcement surveillance access point (SAP) linked to the CMTS would not have the decryption key, and would also not know the internal address of the end-user. In order for the law enforcement agency to be able to decode the entire transmission, it would need not only the encryption key but the algorithm (e-g., SIP, SNTP, FTP, etc.) used to code the translated address.

In summary, Packet Cable Security Specification PKT-SP-SEC-1109-030728 and Packet Cable Electronic Surveillance Specification PKT-SP-ESP4 102-0308 1 5 specify the security model only in a transport mode. These two specifications do not describe how to achieve effective surveillance when the network is operating in tunnel mode.

SUMMARY OF THE INVENTION

Addressing the need to offer solutions to the evolving challenges of packet network surveillance, the present invention defines an electronic surveillance procedure for productively intercepting packets in a secured VOP network both in transport mode, when encryption is performed by the service provider and law enforcement has access and in tunneling mode, when end-to-end encryption and NAT are active upstream from a CMTS, i.e. at the end user premises. In one model of the present invention, end-user encryption setup messages passing through the network during call establishment are intercepted at various points and used to effect end-user identification and decryption. In another model, MTA/CM's, MGW's and other downstream CPE devices are targeted for surveillance operations wherever end-user address translation and security associations are accomplished through these devices.

In one embodiment, end-user NAT and encryption-capable devices are targeted for surveillance as part of the delivery function (DF). Law enforcement compliant surveillance mechanisms allow tapping into NAT devices downstream of the CMTS to provide private address and SA information to the Agency when the end-user is operating in tunnel mode. The DF then delivers its collected data to the law enforcement agency-operated collection function (CF) where the data is reviewed and analyzed by the LEA.

For example, when a private IP address has been mapped to a public address through a NAT function, information on the private address will be intercepted at the point of conversion, linked to the associated message and then delivered to the law enforcement agency.

The NAT unit has the following information for each private LAN device mapped to the public IP address:

private address,

RTP port# or application port #, public address

In addition, the NAT unit may have the application specific algorithm (ALG) to handle the mapping. Some the ALGs, such as SIP ALG, can provide user name or user ID, phone number, call ID or call leg number, etc. The information can be valuable for filtering traffic before passing them to the SEDF or law enforcement agency. The information can also be passed down to SEDF or the law enforcement agency to help further diagnose the call. Some user information is critical in order to obtain the encryption key or other essential information.

Depending on the security association (SA) protocols, different information is passed between the two end points. For example, in Transport Layer Security (TLS), a certification given by the server to the client is included in the message. The client uses the certification in a mathematical computation (which is specified in the TLS specification) to generate the encryption key. If the certificate can be intercepted, then the LEA can generate the encryption key.

TLS allows many different encryption protocols to be used. In the SA establishment stage, the message will include the encryption protocol name, such as Data Encryption Standard (DES), Triple Data Encryption Standard (3DES), Advanced Encryption Standard (AES), etc. The encryption protocol name is essential to encrypt or decrypt the following messages. It is essential for the SEDF and law enforcement agency to obtain the encryption protocol name during the SA establishment stage. As soon as the SA is established, all the following messages will be encrypted and it will be impossible to decrypt without the encryption protocol name and the encryption key.

After the SA has been established, any subsequent configuration and signaling messages might be encrypted. In the signaling messages or SA messages, the media stream encryption method and key may also be exchanged between two users. This is depending on the media encryption protocol and SA protocol. For example, the Session Description Protocol (SDP) in a Session Initiation Protocol (SIP) may contain a statement to exchange the encryption key, such as:

$a$=key–mgmt: data

If the law enforcement agency can intercept the SIP message and abstract the SDP in time, the subsequent media stream can be decrypted.

In addition, when security associations are not performed using a Packet Cable style CMTS, the DF will obtain the SA messages from the end-user (CPE) security management devices during security association establishment. Then the law enforcement agency may be able to interpret the SA messages to obtain the encryption method and keys and then collect and decrypt the transmitted media packets.

In a VOP network, the call signaling or call information (CI) packets take different paths from the voice message or call content (CC) packet paths.

(i) The signaling packets are transmitted between an end-point and a call server (CS) or proxy server (PS).

(ii) The media packets are transmitted directly between the two end-points.

FIGS. 4A through 8B illustrate packet paths and call flows for a number of packet models.

There is one call set-up SA between an end-point and a CS or PS and a second call message SA between the two end-points. Each SA is independent from the other. The SA between an end-point and a CS or PS can be established once for all calls, or on a per-call basis and it must be established before the SA between the two end-points on a per-call basis. In order for the call set-up SA not to be cracked by an intruder, it must have a limited life-time, which often is a few seconds to a few minutes.

Inside the call signal packets, the media path is specified in a different protocol, such as Session Description Protocol (SDP). The media path is determined by more than one parameter, such as application port, RTP/RTCP port, and IP port. If the signaling path and the media description protocol cannot be decrypted and interpreted by a law enforcement agent, then it is unlikely for the law enforcement agent to know which media stream the two end-points take. Thus, they will not be able to intercept and interpret the media packets.

Network Address Translation (NAT) is used for a device to map a set of private IP addresses into one or more public IP addresses. For different transmission applications, such as SIP, SNTP, FTP, etc., there must be an application-specific algorithm (ALG) implemented for each application to pass through the NAT.

When the end-point encrypts its packets, which have a private IP address in the header and media description field, such as SDP, the NAT device must either have the security key to decrypt the packets and modify the address fields in the header and media description field, or it has to turn off the NAT function and assign each device with only a public IP address. If the security key is not given to the NAT device willingly by the end-point, the NAT device could implement the same mechanism as the CALEA intercept box does to obtain the key. However, the NAT device is, unlike the law enforcement agent, not legally permitted to intercept and interpret the packets. The law enforcement agent must obtain the security key and support of NAT with the ALG for the application in order to intercept the packets from the targeted devices. The challenge is to know which private IP address to be mapped onto which public IP address. To do that, the interception box must obtain the information from the NAT device.

There are many different security protocols to be used, for example, IPSec, SSH, SRTP, etc. In each security protocol, different encryption/decryption protocols might be used. For example, IPSec allows for use any one of the encryption protocols: Data Encryption Standard (DES), Triple Data Encryption Standard (3DES), and Advanced Encryption Standard (AES). In each encryption protocol, different key sizes can be used as well. The encryption protocol and key size, and possibly other parameters, are negotiated during SA establishment. A CALEA interception box must be able to support a variety of security protocols and encryption methods and their associated parameters (such as key sizes).

Encryption requires a significant amount of processing time. Some devices use hardware to perform encryption/decryption for efficiency. Since hardware encryption is specific to an encryption protocol, it is difficult for a CALEA interception box to provide hardware encryption for a variety of security protocols and encryption protocols. A CALEA interception box must be equipped with a fast processor to perform encryption when the targeting device might be using hardware for encryption/decryption.

Also the PacketCable Electronic Surveillance Specification describes security in transport mode with interception performed at the CMTS, rather than the end-points, such as end-user PCs or IP Phones (IPPs). However, most security is implemented on the end-points in the current VOP market and majority of them operate in the tunnel mode.

In order to solve the security issues for CALEA, a CALEA interception box must intercept packets from the targeted devices during an early stage of SA establishment in order to obtain the security keys and other security parameters. Where to perform interception depends on many factors: NAT, Dynamic Host Configuration Protocol (DHCP), VPN/security end-point, etc.

In a voice signal processing system, depending on the signal processing protocol, different network elements will process different information. In some cases, intercepting the encryption protocol name and key is possible, in some cases, it is still impossible.

In a managed SIP or MGCP based VOP system, the proxy server (PS) or call server (CS) may have the certificate that can be used to generate the encryption key, such as in the case of TLS protocol as described above. In that case, the NAT unit (which usually resides on the router or MG) and the PS/CS need to cooperate with the DF and the LEA to provide information in real-time. If any of the units are not providing essential information in real-time, the law enforcement agency will not know which media stream to intercept, and therefore, will not be able to monitor the call. The media stream is not stored anywhere in the network, once it is lost, it cannot be regenerated, unlike a data network, wherein the data is stored and forwarded.

In the case of peer-to-peer SIP communication with SIP intelligence on the phone or PC, a router is not needed (no NAT function is required). Then, unless the user on the phone or PC is willing to cooperate, it is almost impossible to interpret the message and obtain the encryption protocol, name and key. If the above devices have no router function, then a NAT router is needed. In that case, intercepting at the router as described earlier is possible.

If the VPN/security end-point is a PC or IPP, it will matter how the end-point obtains the IP address. If the end-point IP address is obtained through Dynamic Host Configuration Protocol (DHCP), then there is no NAT and interception can be performed in any device. However, the packets from the same device can take different routes, therefore, it is better to intercept the packets before a different path can be taken, usually from CMTS to the Internet.

When NAT is present, the best place to intercept is where the NAT function resides. Often that is the MTA, instead of the CMTS, as defined in the PacketCable Electronic Surveillance specification, although it is possible for NAT to be on a CMTS. The NAT unit maps the private IP address to public IP address and vice versa, so the packets should be intercepted on the LAN site before NAT is performed. Otherwise, the interception box needs to do packet filtering in a stream of mixed messages with the same public IP address. Also the NAT unit has the application algorithm (ALG) to handle the application specific translation function. For example, an initial incoming SIP call has only a public IP address. In order to determine which private IP address to map the call to, the NAT has to run the SIP ALG, which uses the user ID in the SIP message, such as alice@wonderlane.com or the CallerID in the header, to find Alice's private IP address.

Note that Alice must have already registered her private IP address and her name and/or CallerID with the NAT device. Once the CALEA interception box is able to intercept the targeted device's packets, it should try to obtain the SA establishment messages. If the security mechanism is not based on the standard protocols, then the law enforcement agent will have a difficult time to interpret the security messages and subsequently decrypt the SA messages and media packets. If the security messages are based on the standard protocols, then from the SA establishment messages, the CALEA interception box should be able to figure out the key, key size, and encryption method.

The U.S. TIA has published a set of message formats for CALEA in PSTN. Since the Internet has completely different architecture, protocols, message formats, and call flows, TIA must publish a new set of specifications for CALEA on the Internet. The PacketCable specifications can be a subset, and in fact, they are mentioned by TIA. However, modifications to PacketCable Security Specification and PacketCable Electronic Surveillance have to be made in order to support many VOP security requirements. Also, a VOP security solution that is not cable-based should be specified outside the PacketCable specifications, although the principle may be the same.

There are some CALEA models addressed by the FCC, including one PSTN CALEA implementation. PacketCable has the defined a cable-based surveillance specification to support CALEA. Many people are looking into using PacketCable's specification as the guidelines for VOP CALEA implementation. However, there are limitations in PacketCable CALEA implementation. The present invention defines five Voice over Packet (VOP) CALEA architecture models, including call flows. These five models are generic to any VOP networks, including VoIP.

The first model, shown in FIG. 4A defines the router as the Surveillance (or Security) Access Point (SAP). It is the recommended model, because the router has most of the information and capability to support CALEA. The second model, shown in FIG. 5A, defines the Call Server and the centralized media gateway (CMGW) as the secure access point. The third model, shown in FIG. 6A, puts the end-user's Media Gateway (MG) as the SAP. This model is not recommended because often the MG is purchased by the targeted end-user. When that is the case, the end-user may be able to thwart the surveillance operations by altering the device. The fourth model, shown in FIG. 7A, utilizes the Trunk Gateway (TGW) as the SAP. The TGW is needed to inter-work a provider network with a public switched telephone network (PSTN). The fifth model, as shown in FIG. 8A, is the peer-to-peer model. There is no call server and all call placement intelligence resides on the IP devices. This model is not considered to be a "managed" VOP network, therefore, it is not subject to CALEA requirements. However, the managed network portion of the model should attempt to facilitate CALEA.

Note that all call flow diagrams show SAPs for both end-users. In some cases, the Law Enforcement Agents will only set up the SAP for one targeted user. They may not know who the terminator will be or has no need to intercept, as one interception point is sufficient to intercept bi-directional traffic.

The goals for security services are to provide privacy, packet integrity, authentication and non-repudiation. Privacy means that packets cannot be intercepted. Packet integrity means that the packets have not been modified. Authentication means that the person involved in the communication is who he/she claims to be. Non-repudiation means the message sent and received cannot be denied. Because VOP needs to be as secure as possible, CALEA conflicts with the goal of privacy.

The FCC published guidelines for implementing CALEA. The guidelines are unlike most communication standards and do not provide sufficient details for actual implementation. The FCC requirements are general, requiring a SAP to provide Call Information (CI, call control messages), or Call Contents (CC, media streams), or both in the formats and options that are compliant to the J-25 specification. The SAP allows access to CI and CC through the Delivery Function (DF) operation. The DF replicates the CC and CI and sends it to the LCE, which exists in conjunction with the Collection Function (CF) according to the CALEA formats and options. The CF resides with the law enforcement agency.

Guidelines FCC04-187 describe three CALEA models for SAP and Lawful Collection Equipment (LCE). These three models are illustrated in FIGS. 9A, B and C.

The first model, FIG. 9A, shows is a direct feed from the SAPs to the LCE. The SAPs provide many options and interfaces with the LCE. Each interface must provide CC and CI.

The second model, FIG. 9B, employs a mediation device between the SAPs and the LCE. In this model, each SAP may provide an interface to intercept only CI, or CC, or both. The mediation device is within the managed network provider's domain. There are a few practical implementations, such as Time Warner and Comcast networks.

The third model, FIG. 9C, replaces the mediation device with an external system. The main difference between this model and the previous one is that the external system exists and operates outside of the managed domain. This model presents challenges when DHCP is in use. It will be difficult for the external system to map the targeted device with a dynamic IP address.

The descriptions of these three models lack sufficient details and are insufficient to design and implement CALEA.

When comparing VOP to PSTN Architecture, a number of major differences important to the implementation of CALEA are found. These are described below.

First, the class 5 switch is equivalent to the combination of the Media Gateway (MG) and Call Server (CS), except that the MG and CS are distributed rather than co-located. The class 5 switch uses the common channel signaling (CCS) method for call control. The VoP uses SIP, MGCP, or H.245 for call control. The VoP call control messages look quite different from the CCS messages, however, the types of messages and call flow are very similar in VoP and PSTN. In PSTN, a class 5 switch is owned by one SP, while in VoP, call servers are owned by the SP and Residential media gateways (RMGW) are owned by end-users. CSs and MGs may also belong to a cooperation.

Second, the network management unit is similar to what it was in the PSTN, except it might not be collocated with the CS and MG.

Third, a Trunk Gateway (TGW) provides interconnection with the PSTN.

The distributed nature of VOP in comparison to the centralized architecture of PSTN is a key differentiation for CALEA. Since many components are different between PSTN and VOP, in order to implement VOP CALEA, the present invention teaches the analysis of the network and the identification of appropriate components and implementation of SAPs in the VoP network to produce productive surveillance using the VoP functional components as described herein.

In the VoP network, the call control messages and the media are often traveling in independent paths. Unlike the PSTN where CCS messaging determines the media path, the VOP signaling message does not determine the media path. The media path is determined either by the MG and/or the router. However, at the router level, it is difficult to distinguish whether the packets are voice or call control packets.

In the case of peer-to-peer VoP communication, there is no call server involved. The call set-up intelligence resides within the IP devices. This makes CALEA interception even more challenging. The VoP devices often obtain their IP address through DHCP. Dynamic IP address assignment makes it difficult for an IP device to be associated with its IP address.

With reference again to the PacketCable CALEA implementation as shown in FIG. 3, it is the first set of CALEA standards for a VoP network. The Packet Cable security spec is one of the well defined pioneer protocols for VoIP Security and CALEA. It has been implemented and deployed in the field. The PacketCable CALEA model puts Cable Modem Termination System (CMTS) and Call Management Server (CMS) as the Secure Access Points (SAP's). The Trunk Media Gateway (TGW) is also a SAP when interworking with a PSTN. The CMTS is in the role similar to a router.

However, as technologies evolved, there are new requirements for VoIP security. Below is the list of limitations in the PacketCable security.

Security Association (SA) in VOP is between two CPEs (SMGWs, or IP Phones, or PCs), rather than between two Cms/MTS/CMTS.

CPE has the encryption key; CM/MTS/CMTS has no encryption key and other SA parameters.

Security is defined in a transport mode, while in real-life, more IP devices are running in a tunneling mode.

Call control model is defined as client-server (MGCP). It didn't address the peer-to-peer (SIP) model.

Firewalls and Network Address Translation is not addressed.

IPSec and IKE raise real-time call processing performance concerns.

Public key method, like Kerberos, requires trusty 3rd party for key repository.

Different security mechanisms (protocols, encryption methods & associated parameters, etc.) that need to be supported.

These limitations are overcome by proper implementation of the procedure of the present invention.

BRIEF DESCRIPTION OF THE DRAWINGS

Exemplary embodiments of the invention are discussed hereinafter in reference to the following drawings, in which:

FIG. 1B shows the call flow of the PSTN CALEA model. All call flows are based on SIP.

FIG. 2 is block diagram of the functional components of a packet network for transmission of VOP packets.

FIG. 4B is an exemplary call setup/flow diagram for the embodiment of FIG. 4A.

FIG. 5B is an exemplary call setup/flow diagram for the embodiment of FIG. 5A.

FIG. 6B is an exemplary call setup/flow diagram for the embodiment of FIG. 6A.

FIG. 7B is an exemplary call setup/flow diagram for the embodiment of FIG. 7A.

DETAILED DESCRIPTION OF PREFERRED EXEMPLARY EMBODIMENTS

The following sections describe five generic VOP CALEA models. It is assumed that the IP devices are the residential gateways. The disclosure teaches a detailed description on how CALEA works in the first model. For the other four models, only the differences are addressed. Note that each end device may have different CS. To simplify the call flows, only one CS is illustrated.

Figure 1A:
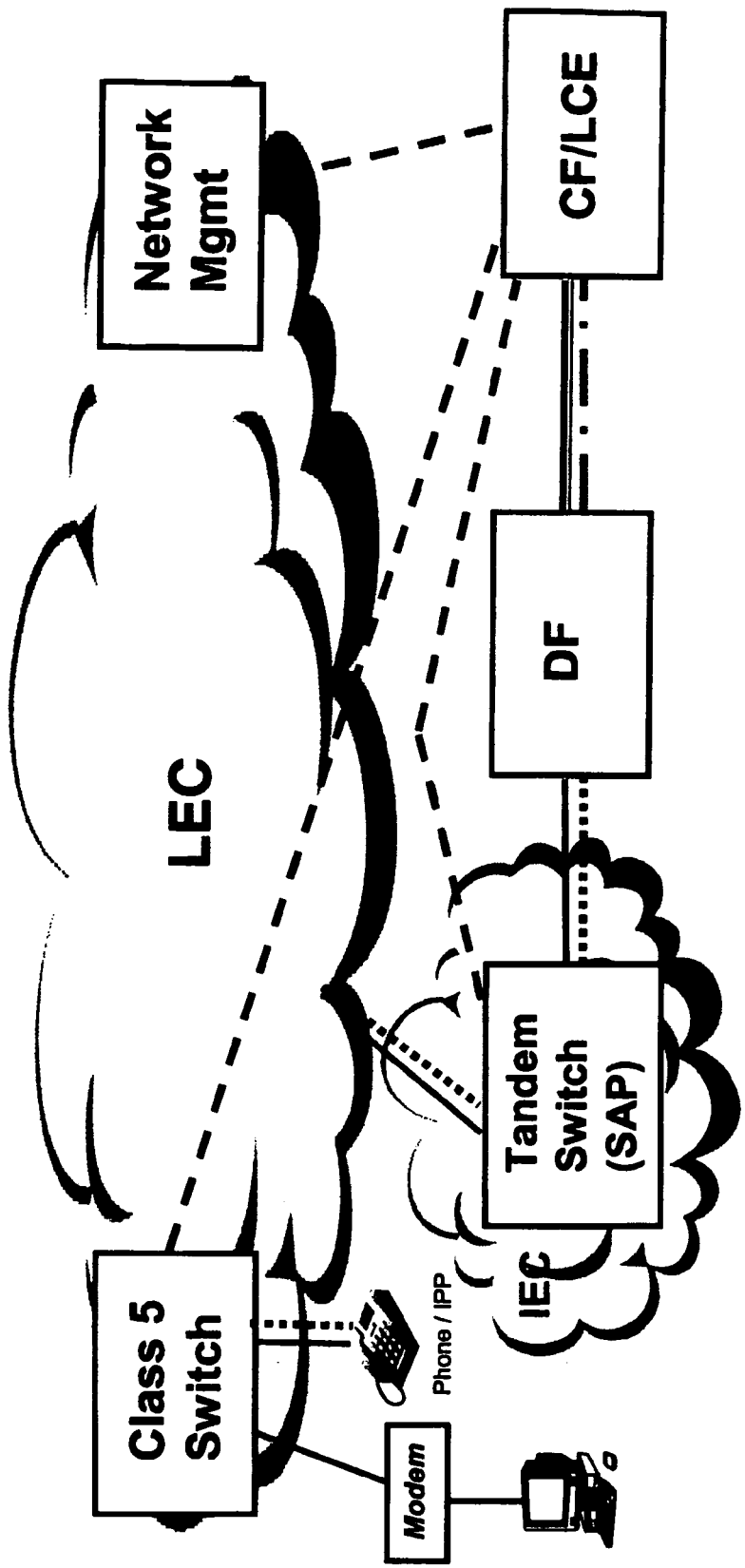
FIG. 1A is a functional block diagram of a PSTN network with CALEA implemented to provide for surveillance of traffic.
Figure 3:
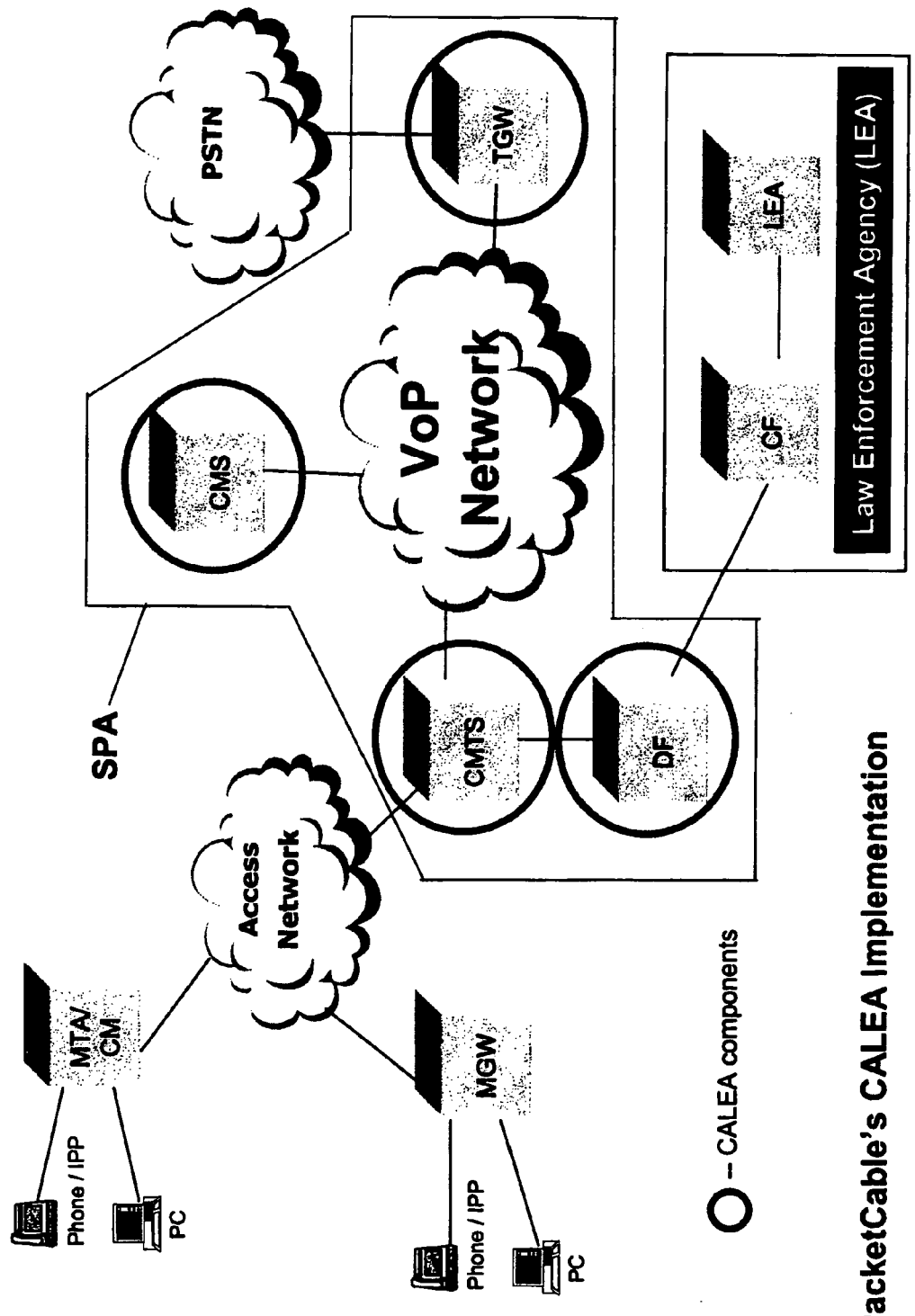
FIG. 3 is a functional block diagram of a current model of electronic surveillance according to the Packet Cable specification for CALEA.
Figure 4A:
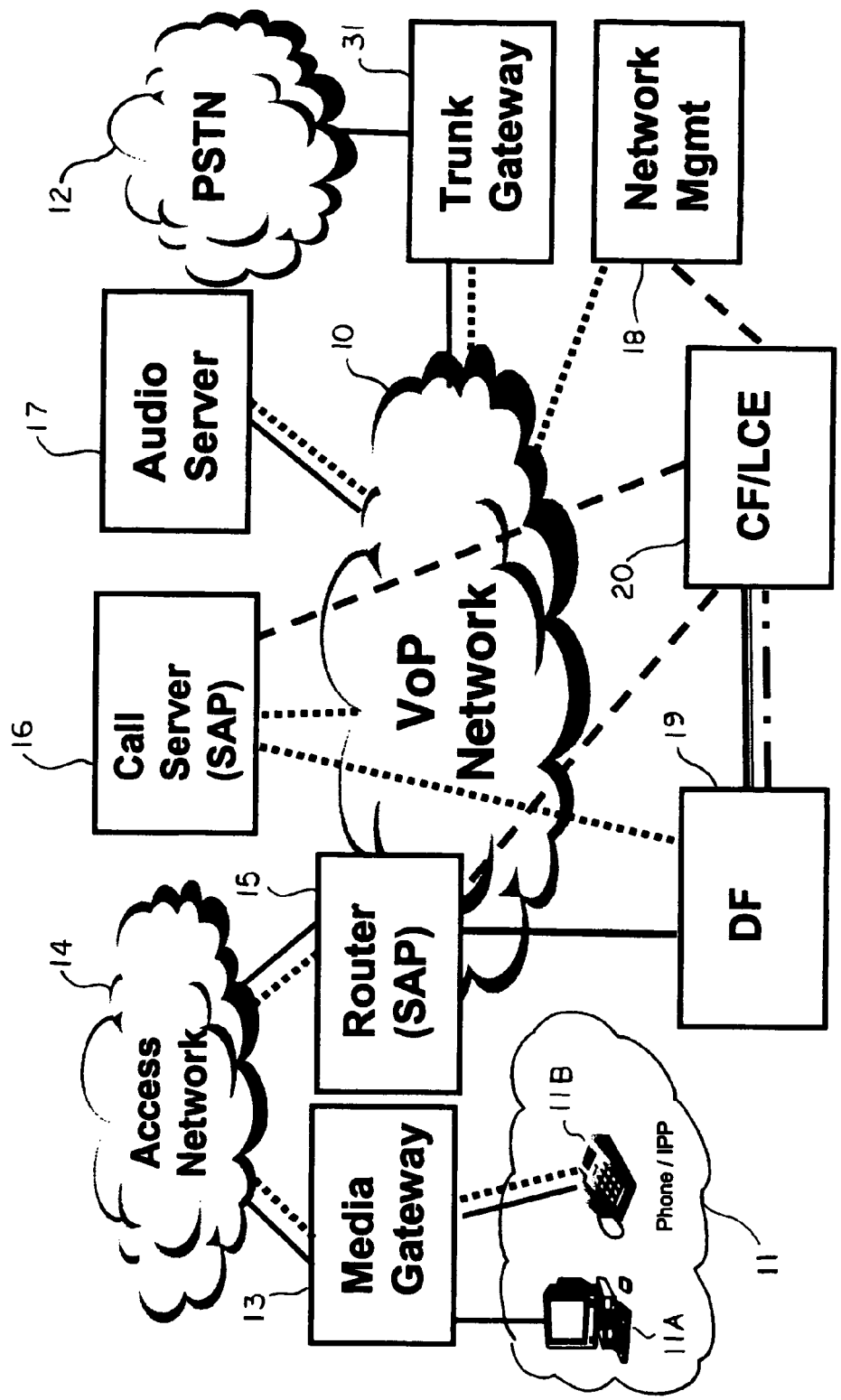
FIG. 4A is a functional block diagram of a first exemplary embodiment model for implementation of enhanced of electronic surveillance according to a first embodiment of the present invention.

VOP CALEA—Model 1—Router:

The first model is the router model. It is shown in FIGS. 4A and 4B. In this model, the router and the CS are the SAP's. The router in this model is in a similar role to CMTS in the PacketCable architecture. The router has more information and capabilities to control the targeted IP devices than any other network elements. The router is connected to the public packet network, that makes it more vulnerable for monitoring or interception. Therefore, the router model is recommended.

The disadvantage of this method is that it is difficult to obtain the router information before or during call setup, since the call setup stage does not establish the media path, like PSTN does. Without the router information, such as router's IP address, it is difficult to know which router to monitor. Hence, law enforcement cannot intercept the IP device behind the router.

Stage 1—Subscription:

One challenge for VOP CALEA is the location of the IP device. Some Service Providers (SP) use a fixed MAC address of an IP device and user ID and password for initial authentication. It does not matter where the device is located, as long as the device can reach the SP. Assuming user A has VOP subscription to SP-A with his MAC address, user ID, and password. The router that user A will be plugged into is not connected SP-A, but to an Internet Service Provider (ISP) ISP-A.

Figure 5A:
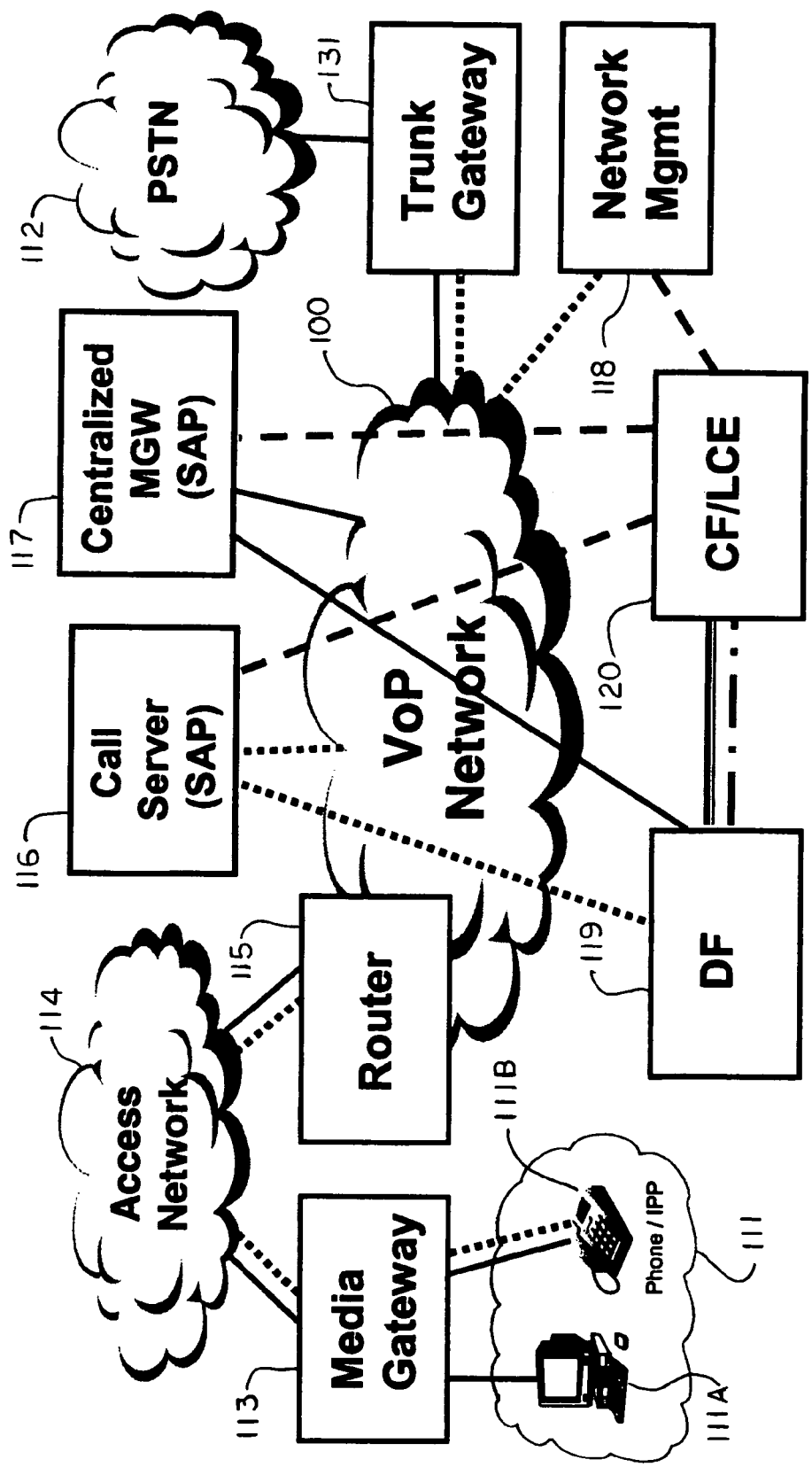
FIG. 5A is a functional block diagram of a second embodiment model for implementation of enhanced of electronic surveillance according to a second embodiment of the present invention.

Law enforcement informs SP-A and ISP-A of user A under the CALEA act, so CS-A and ISP-A must forward all packets to/from user A to the LCE in the future. But at this moment, SP-A does not know the IP address of user A. If SP-A requires all media to go through its centralized MGW, then the centralized MGW, instead of a router close to user A, can be used for intercepting packets, as indicated in FIG. 5A.

Stage 2—Startup Configuration, FIG. 4B:

When user A is plugged into a router, which is connected to ISP-A, User-A receives a dynamically assigned IP address, assuming 140.1.1.100. Router-A for user A has IP address, for example, 140.1.1.50. The call server for user A at the SP-A is CS-A and the configuration server at the SP-A is Conf-A. For simplicity, the call flows just show CS, not Conf. Note that the SP-A for VOP applications may or may not be the same as the ISP which provides basic Internet Access for router A and the targeted IP device.

Next, user A will login to Conf-A by typing in the URL of Conf-A. All the messages are going through the router. The router is not aware if CALEA act is on user A, but it adds its IP address 140.1.1.50 into the IP packets anyway. Note that this is a proposed new message to obtain the router's IP address. Currently, the router does not add its IP address to the packets that route through it. After Conf-A authenticates user A with its MAC address, login ID, and password, user A is allowed to use services from SP-A. Conf-A sends all the packets to/from user A to DF. DF then replicates the packets to LCE. If security for configuration is needed, Conf-A should be able to provide the encryption key to LCE.

Stage 3—Security Association between an IP Device and Call Server:

If security for signaling message is needed, a Security Association (SA) between user A and CS-A will be needed before exchanging any message. The SA can be on per-call basis or expired at a fixed time interval. In the later case, it must not interrupt an active call during re-negotiating the key. Here, we use Transportation Layer Security (TLS) as the security protocol for signaling. We assume that the SA is established at startup and the SA is expired at midnight. CS-A must forward all the TLS messages related to user A to the LCE. The LCE obtains the security key from the message, like user A's IP device would.

When describing the embodiment, it is assumed that the LCE obtains the IP address of router. The LCE knows which router to monitor now. So, LCE requests router A to forward all packets to and from user A.

Stage 4—Call setup at the Originating Side:

When user A takes the handset off hook, as shown in FIG. 4B, his IP device generates an off-hook event notification to CS-A through the router. Router-A and CS-A replicate all packets to/from user A to the LCE.

Stage 5—Locating Terminating User, Router, and Call Server:

At this moment, the LCE still does not know who the terminator and the terminating CS are until CS-A processes the first call setup request message and sends an INVITE message to the terminating CS-B. The LCE abstracts CS-B information from the second INVITE message. The LCE requests CS-B to comply with CALEA by sending all the messages to/from the terminating user B.

In some cases, intercepting user B is not necessary, as long as the LCE can intercept bi-directional traffic at some network element. However, there are many reasons that we need to intercept at both user A and user B. One reason is that user A might have call features, such as call forwarding, that make it difficult to track down where user A is after call forwarding, therefore, interception of packets to/from user B is helpful.

Also, there will be a SA between user A and user B directly for the media streams. We want to obtain the media security keys for user A and user B. The media key can be created and exchanged in many ways. The paper Sophia Scoggins & Ron Nag, "Security Challenges and Enhancement Methods for VoP Networks", Embedded Security Seminar, Boston, Sep. 15, 2004, describes different methods in details. MIKEY and SDP are some options. If the security key is static or manually entered, instead of through a key exchange protocol, the LCE won't be able to obtain the encryption key(s) from the messages. In the case of SDP, the key information will be easily obtained from the signaling messages, even if the signaling messages are encrypted.

If an incoming call is under CALEA act, the LCE will finds the terminating CS and end user B, as described above. Once the terminating CS starts sending packets to the DF and LCE, the LCE will find the terminating router information and request the terminating router to forward all packets to/from the terminating user.

VoP CALEA Model 2—Centralized Media Gateway (CMG) Model

FIGS. 5A and 5B, illustrate the Centralized MGW (CMG) model of VOP CALEA implementation. The CMGW is the SAP. It is like a security boarder gateway in many commercial products, but terminates not just security association, but also the voice streams. The end devices are usually unaware of the CMGW and think that it is communicating with the remote end device.

The CMGW has the security keys for all media streams. It is the ideal candidate to provide interception. The drawback is that the CMGW will be the traffic bottleneck as illustrated in FIG. 5B.

VOP CALEA Model 3—Distributed Media Gateway Model

Figure 6A:
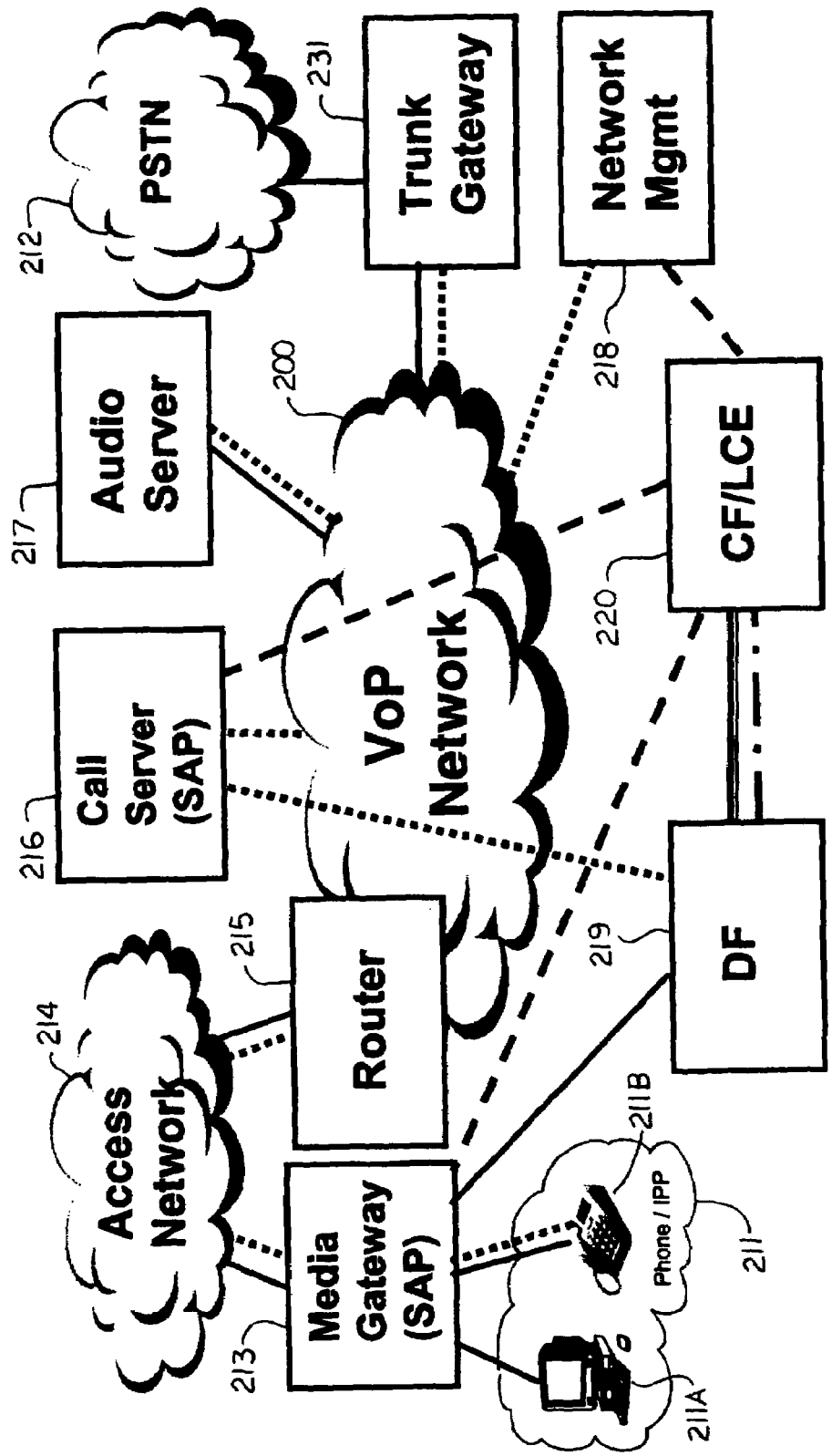
FIG. 6A is a functional block diagram of a third exemplary embodiment model for implementation of enhanced of electronic surveillance according to a third embodiment of the present invention.

FIGS. 6A and 6B illustrate the distributed MGW model of VOP CALEA implementation. In this model, the MGW is the SAP. Since the MGW has the security key, it seems the easiest one to provide CALEA support. However, a Residential MG (RGW) is in the customer premises. If the user is aware of CALEA activities, the user is likely to take any action to stop or interfere with CALEA. Also, the MGW is hidden behind the public packet network and access by an external system is difficult and subject to loss or detection. An MGW is usually cost sensitive with cost-optimized processing power and memory. In order to support CALEA, more processing power and memory will be needed. That puts more burden on the MGW. In conclusion, this model is least favored.

VOP CALEA Model 4—Trunk Gateway Model

Figure 7A:
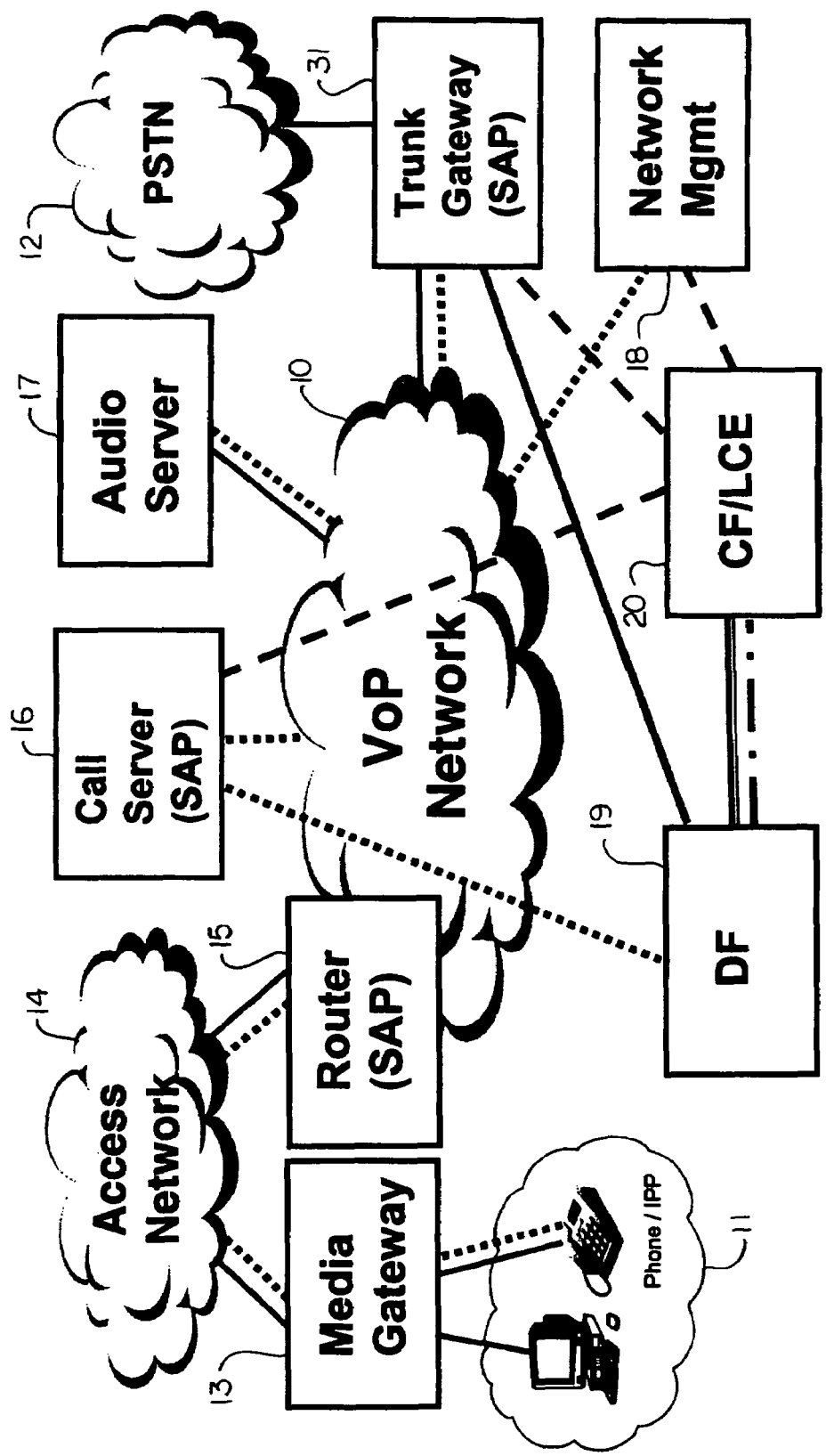
FIG. 7A is a functional block diagram of a fourth exemplary embodiment model for implementation of enhanced of electronic surveillance according to a fourth embodiment of the present invention.

FIGS. 7A and 7B illustrate the Trunk Gateway (TGW) model of VOP CALEA implementation. If any party in a call is on the PSTN, while another party is an IP device, then a trunk gateway (TGW) is needed for interworking. The TGW is the SAP. A class 5 switch that controls the call channels linking to the trunk gateway needs to be a SAP for the PSTN side, too. On the VOP side, the CS also needs to be a SAP for the IP device.

The TGW would intercept packets to and from both end points, eliminating the need to use a router as an SAP in addition to the TGW. FIG. 7B illustrates the call flow for the TGW VOP CLAEA. However, a TGW usually just aggregates and multiplexes traffic and has no knowledge of call processing, Network Address Translation (NAT) and firewall. In that case, a router may be added as the SAP, in the manner descried above with reference to the router model.

VoP CALEA Model 5—Peer-to-Peer Model

Figure 8A:
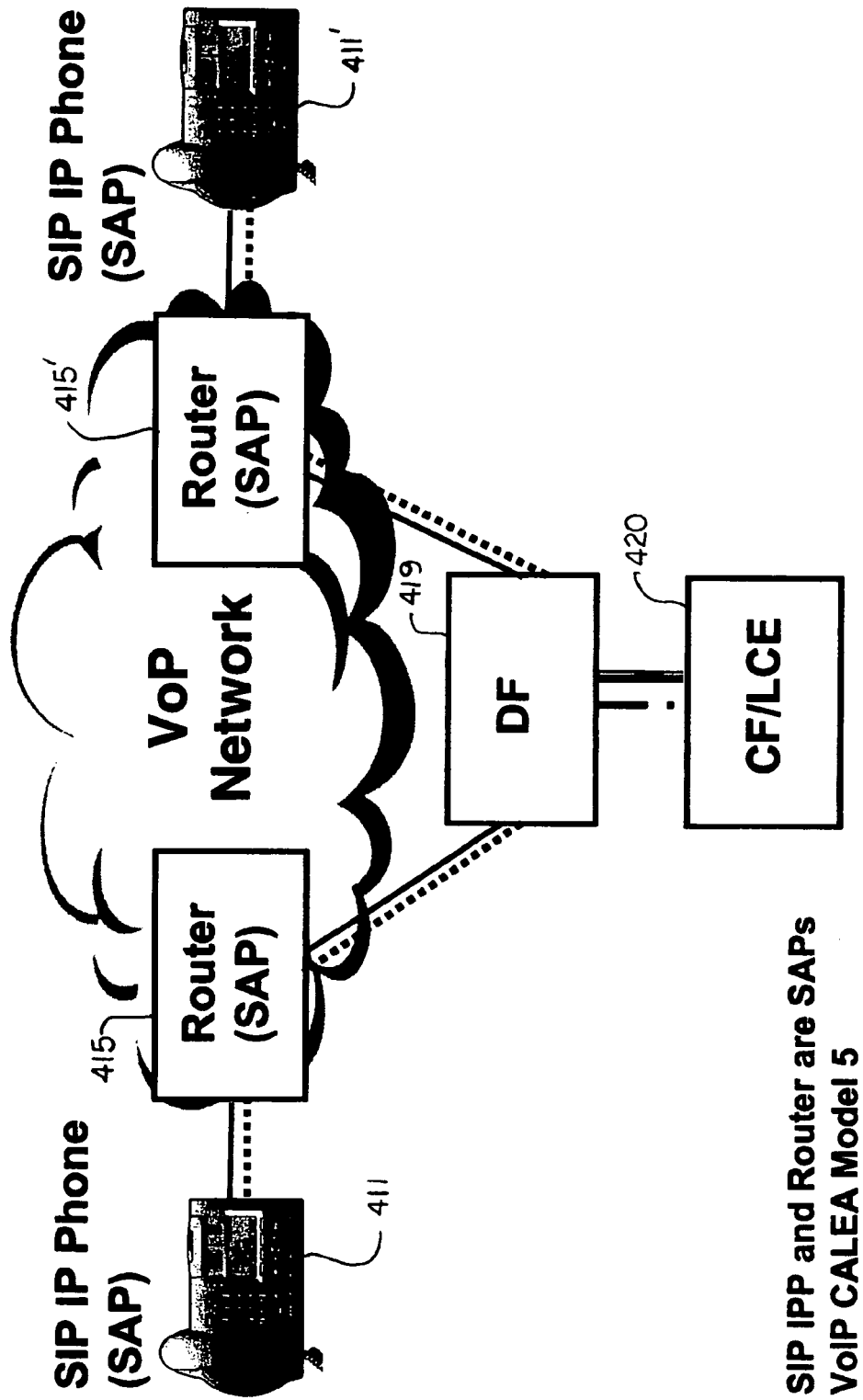
FIG. 8A is a functional block diagram of a fifth exemplary embodiment model for implementation of enhanced of electronic surveillance according to a fifth embodiment of the present invention.
Figure 8B:
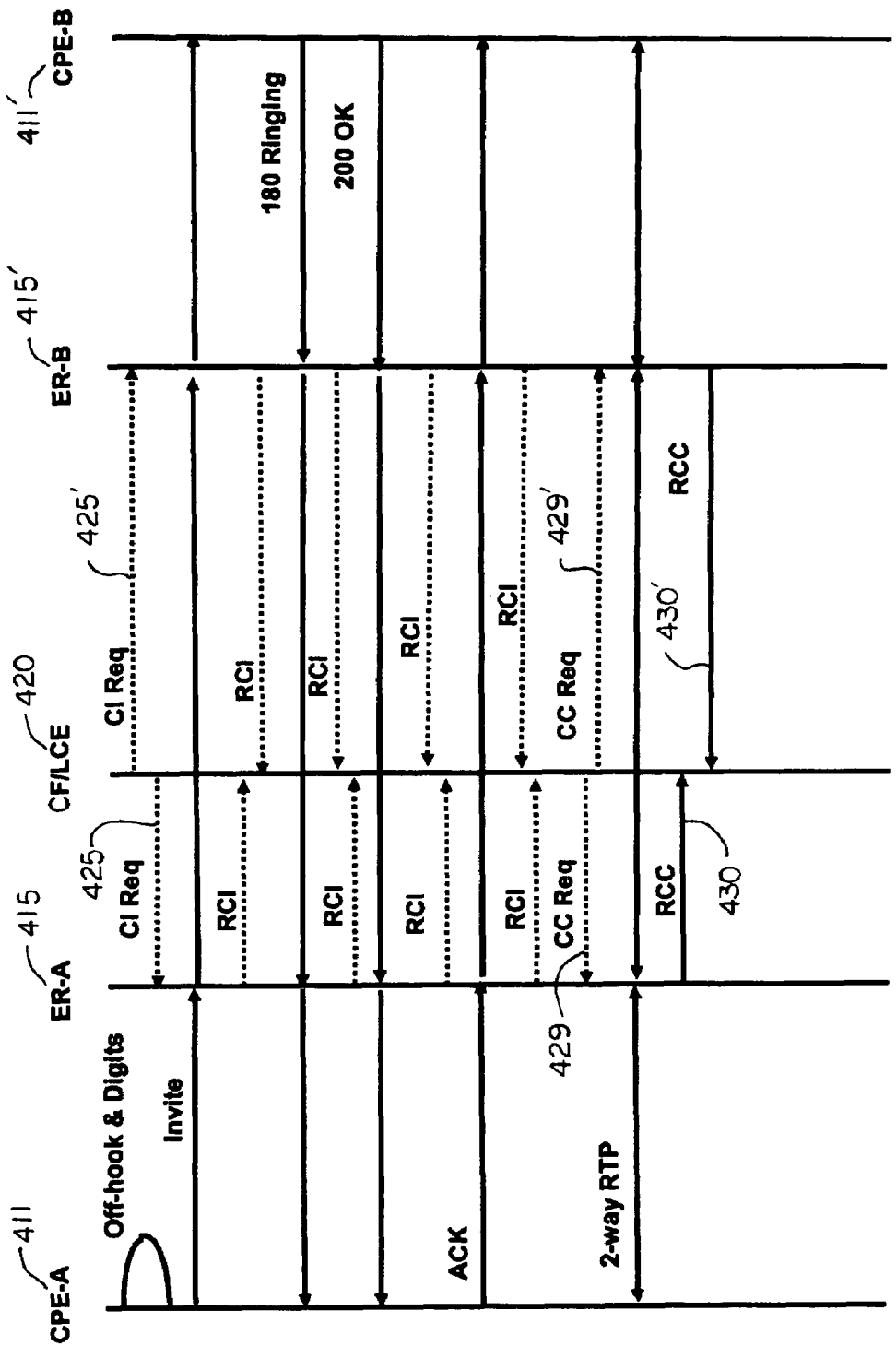
FIG. 8B is an exemplary call setup/flow diagram for the embodiment of FIG. 8A.
Figure 9A:
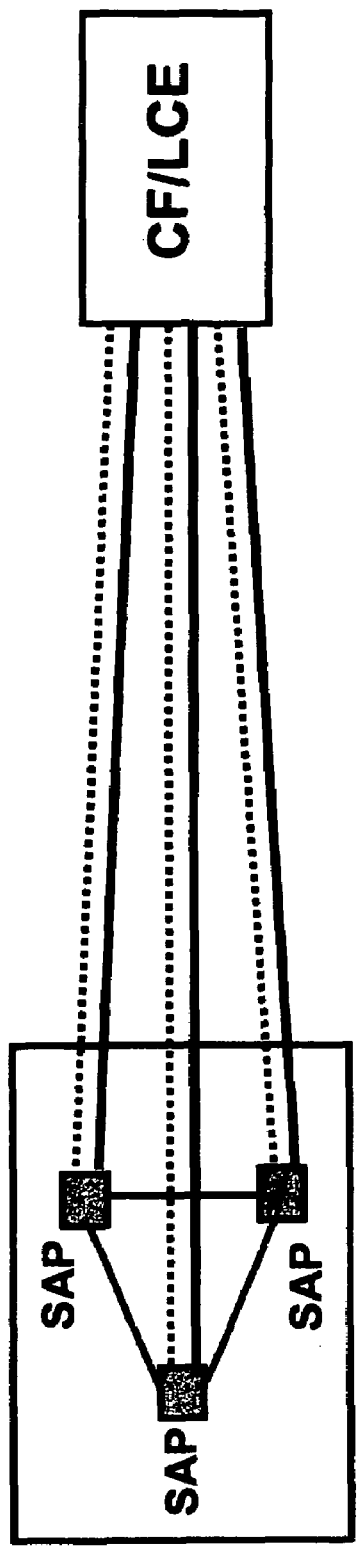
FIG. 9A is a depiction of the first model of CALEA implementation for managed networks.
Figure 9B:
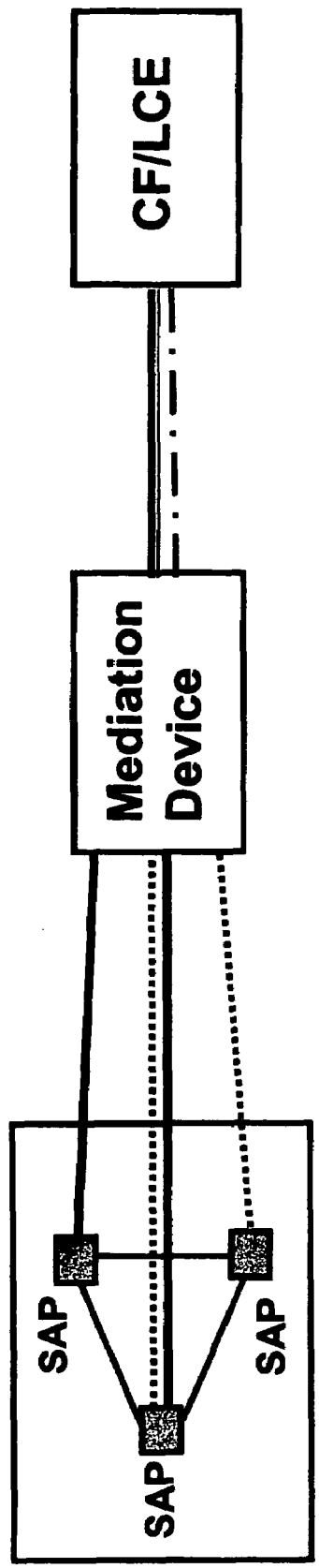
FIG. 9B is a depiction of the second model of CALEA implementation for managed networks, utilizing a mediation device.
Figure 9C:
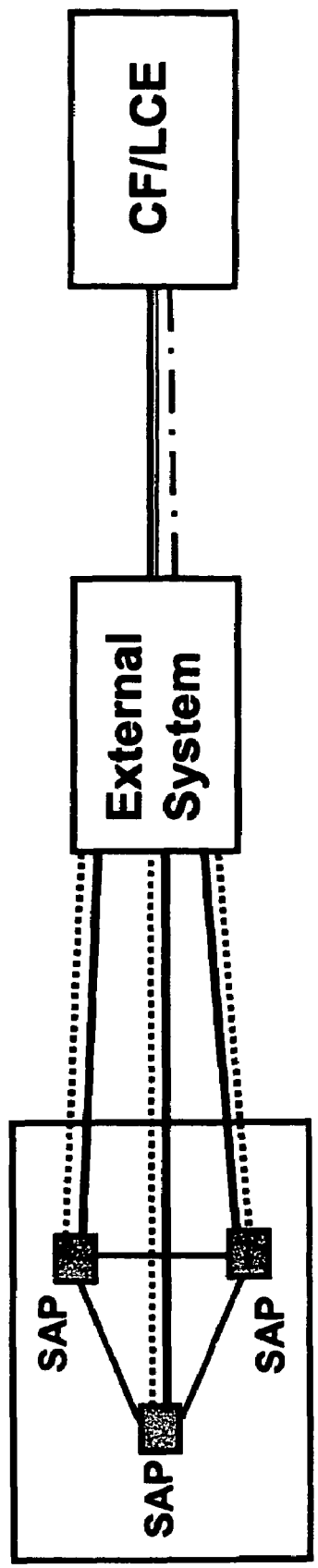
FIG. 9C is a depiction of the third model of CALEA implementation for managed networks, utilizing an external (third party) system.

FIGS. 8A and 8B illustrate the peer-to-peer communication model to support CALEA. The peer-to-peer model has intelligence on both end IP devices. There is no call server. Therefore, CALEA cannot be implemented in the manner described above. The SAP must be either on the IP devices or the router. If the SAP is on the IP device, it would be difficult to get the IP device's cooperation, just like the MGW model. If the SAP is on the router, it would be similar to the router model. However, it is more difficult than the router model to get the router information from the IP device before LCE can instruct the router to intercept the CC and CI. Once the router can be identified, there would be fewer components to work with to intercept the CC and CI than the router model. However, if router just forward all packets to and from the targeted device to the DF/LCE, it will not be able to distinguish the CC packets from CI packets, like the CS in the other models does.

Implementation of CALEA in a VOP network presents challenges. Security presents the challenge of acquiring the key for decryption. In the absence of security measures, there are still many obstacles to over come in implementing CALEA in VOP. The present invention teaches the identification of those challenges and the implementation of methods and functionality to overcome the challenges which fall into two catalogs, with or without security.

VOP CALEA Challenges—Without Security

Challenge 1—Dynamic IP Address Assignment: Law enforcement knows the targeted person to wire-tape his/her communication lines, but does not known the IP address until the person logs in. This is unlike PSTN with predetermined phone number and channels from the subscriber line to the line card at the class 5 switch. Therefore, the LCE has to obtain the IP address of a targeted device in real-time.

Challenge 2—No Fixed Location: In VOP applications, a user can be at any location logging into the VOP network with fixed MAC address, login ID, and password. That means it would be difficult to pre-arrange for CALEA, instead, CALEA will done in real-time.

Challenge 3—Where is the Router: As we stated earlier, the router model is the recommended model. The challenge for this model is to find the router. By requiring the router to add the router's IP address to the packets along with path, the router will become known. This is currently not implemented in the router, and will require modification on the router.

Challenge 4—Network Address Translation (NAT): If the route implements Network Address Translation (NAT), then there may be more than one IP device behind the router using the same public IP address. In that case, the DF or LCE will receive more traffic than it needs. It will need a packet filtering function.

Challenge 5—Too Many Signaling Protocols: There are many possible signaling protocols. The LCE needs to support a variety of the signaling protocols. The standards based signaling protocols can be determined by its port number, but one can always use proprietary signaling protocols in a peer-to-peer or un-managed environment. When proprietary signaling protocols are used, it is difficult to intercept. For example, user A can use a know ISP to connect to Internet, but use a proprietary signaling peer-to-peer protocol to communicate with a remote user. This connection is still under the "broadband internet access", but it is an un-managed peer-to-peer call model.

Challenge 6—Cooperation of User, ISP, and VOP SP: As we stated in the earlier section, in a managed VOP network, the internet access is provided by an ISP. The VOP service is provided by a VOP SP. Cooperation from the ISP and VOP SP are needed. In a peer-to-peer or non-managed VOP model, cooperation from the targeted user IP device is needed. This level of cooperation is difficult to achieve.

VOP CALEA Challenges—With Security

Security includes authentication and encryption. In CALEA, authentication is not a concern. CALEA is only concerned about the encryption key. The challenge is in obtaining the encryption/decryption key.

Challenge 1—How to obtain encryption key: When the VOP security feature is enabled, the most important question is how to obtain the encryption key. If there is no key exchange occurring during the stage of establishing a SA, then both ends are using static or manual keying. It becomes impossible for the LCE to decrypt the packets. If TLS is used for exchange and generate the encryption key, then it is most likely to obtain the key from the TLS messages. If the key exchange method for media is through SDP in the signaling messages and the keying protocol is symmetric, then it would be easy to obtain the key and decrypt the messages. If the key exchange method is using a public key method and the encryption is not symmetric, then there is no way to obtain the private key to decrypt the packets.

Challenge 2—Too Many Security Protocols: There are many possible security protocols. The standards based security mechanisms can be IPSec, SSL/TLS, SHTTP, SSH, and more. The key exchange protocols can be ISA IKE, embedded within TLS, MIKEY, through SDP, etc. Even within each key exchange protocol, there can be many different methods—five different Diffie-Hellman (DH) groups, public keying, RSA, symmetric key, hybrid keying, etc. The LCE needs to support all security protocols in order to intercept during real-time call processing. If user A and B decide to use proprietary security protocols, then there is no way to intercept and interpret the messages.

VOP CALEA Solutions

Solution 1—Centralized CS and MG

The SIP proxy server is used to find out the remote end device in order to establish a connection. Once the remote IP address is known, the call control messages can go directly between two end points, if no call feature is involving a SIP proxy server. Some call features, such as call transfer and call forwarding, can be implemented either on the network or on the end devices, depending on VOP SP. If the call features are based on the end devices, then the proxy server may not be aware of the call features at all. That means LCE may not be able to intercept the remaining call. If all signaling messages must go through the VOP SP's CS, that will make interception easier.

A call server is not involved in the media stream. The media path is determined by the routers and the end devices. If all voice streams must go through the VOP SP's centralized MG (CMG), then interception would be easy.

Solution 2—Add Router Info to the IP Header

The IPv4 header does not provide a field to add a list of routers along the path. We propose to add a router header option or use a payload field to provide router information. Every time a packet passes by a router from a local device, the router will add its IP address to the optional router header or payload. There would be more than one router along the path. Theoretically, any router can be used for intercepting packets that along its path, however, the router most close to the targeted device will be the best choice. So, if a router sees that there is no route information, it will add its IP address to the IP Header or payload. If the first 4 bytes of payload are in use, such as IPSec Authentication Header (AH) and Encapsulation Security Protocol (ESP), then add the router info after those additional info fields.

Packets from the same end devices may go through different paths, we may find more than one router are used for an end device. However, statistics demonstrate that a majority of packets between two end points go through the same path, unless the path is saturated. If the DF sees more than one route info is added to different packets, all routers in the route info should be intercepted. Once the router is identified, the LCE may want to send a message to stop the router from adding its IP address to the future packets.

The advantage of this approach is that it is very simple to implement. And the routers need not know what signaling or security protocols are in use. The disadvantage of this approach is that it adds too much overhead to the overall traffic, even after we knew the IP address of router. As a result, performance degradation can be expected. Also, packets may go through different routers. Intercepting different routers in real-time may be needed.

Solution 3—Add Route Record to the Signaling Message Header

This approach is to add the route record to the signaling message header. The router first checks the port number of packets. Only if the port number indicates that the packets are signaling packet, the router will modify the header. The drawback of this approach is that the routers need to know the applications. This approach is similar to NAT application algorithm (ALG) to by-pass the NAT unit. If the signaling messages are encrypted, the router has no security key to decrypt the messages, thus this approach won't work.

Solution 4—Ping to Find the Route Record

The CS should be able to use 'ping' to find out the route record, which is the list of routers that the packets go through. Comparing the targeted IP device with the list of routers, the LEA should be able to determine which router to intercept.

Solution 5—Obtain Router Info from DHCP of ISP

When the targeted device initially plugged into a router, it needs to obtain its IP address from the DHCP server of an ISP. The DHCP server knew the IP addresses of the router and of the device. However, the mobility of IP device will make it difficult to determine where the IP device will be plugging into which device.

Solution 6—Enforce Security Key Info in SDP

How to obtain the security key has been a big challenge. We proposed the security key information be included in SDP when CALEA act is in effect. The disadvantage of this approach is that user can easily modify the packets to not include the security key info in SDP. Another concern is that if the security key is obtained by the wrong person, it can do more harm than no security at all.

Solution 7—Enforce Security Protocols

Similar to the previous approach, the standard bodies and ISP must enforce certain security protocols be adopted. This reduces the complexity of security protocols to be supported tremendously. For example, the SIP community endorses TLS for security. The SIP community needs to further refine the authentication and encryption protocols to be supported.

Solution 8—Register at a Trusted 3rd Party with All Security Keys

Currently, some trusted 3rd party organizations, like Verisign, are providing certifications for key registrations. If CALEA requires all end devices with a security feature to register their security keys with a trusted 3rd party, that would make interception much easier. However, there will be many opponents about this resolution, as if the keys fall into the wrong hands, the damages would be significant.

Figure 10:
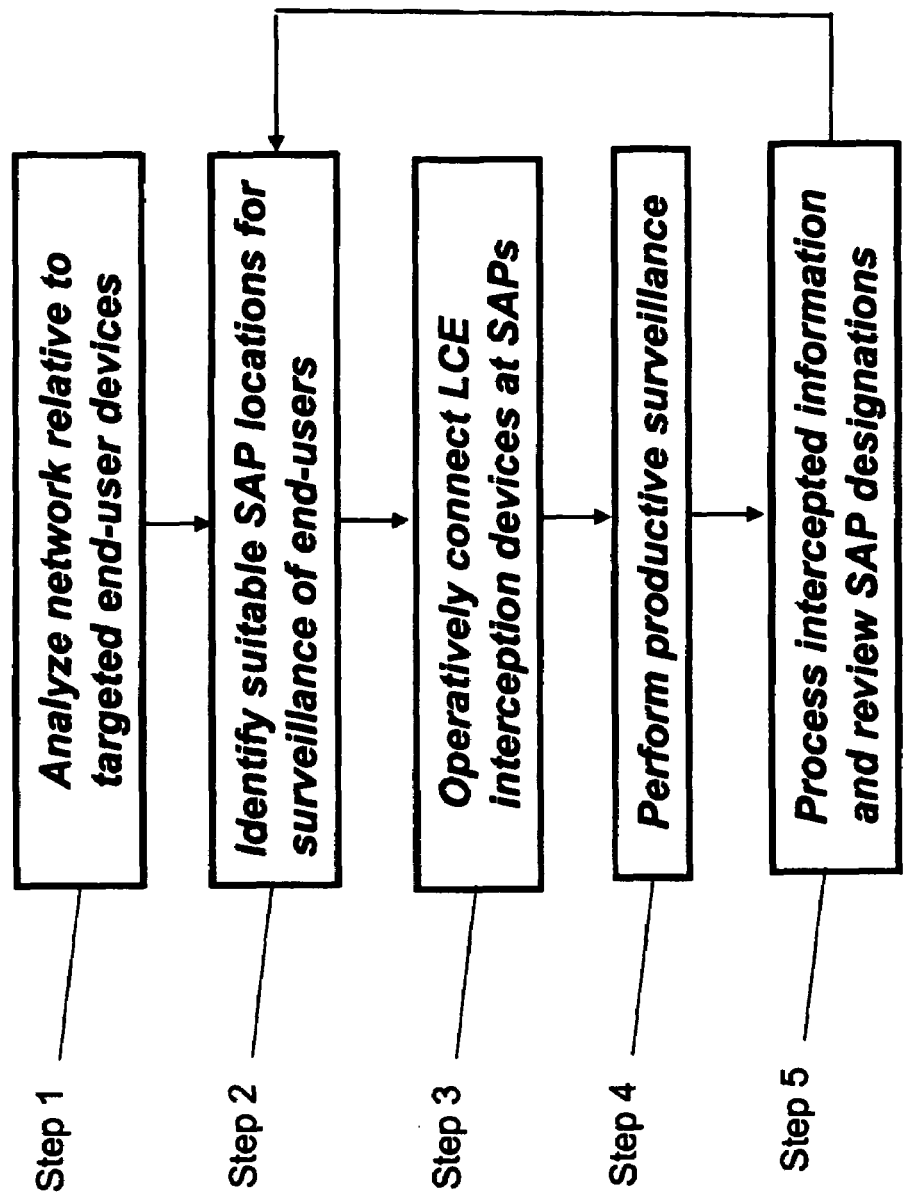
FIG. 10 is a flow diagram depicting the surveillance development and implementation procedure of the present invention.
Figure 11:
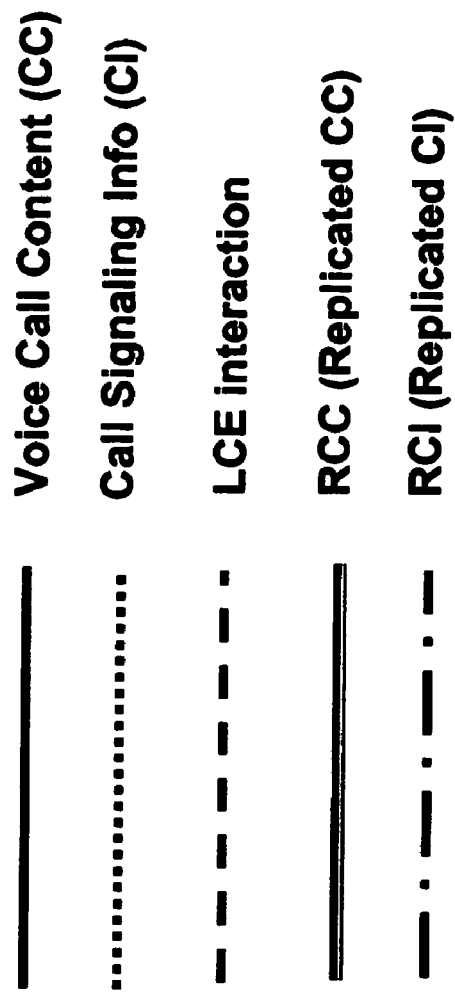
FIG. 11 is a Key to the network diagrams listed above.

The present invention comprises a procedure for electronic surveillance of Voice over Internet Protocol (VoIP) messages in Voice over Packet (VoP) networks when end-to-end encryption/decryption and network address translation (NAT) are being utilized by an end user of said network. As shown in FIG. 10, the inventive procedure comprises the steps of analyzing said network relative to one or a plurality of targeted end-user devices (Step 1), to identify suitable surveillance access points (SAPs) for electronic signal interception based on the system configuration and operation parameters of said network (Step 2), operatively connecting suitable interception devices to said network at said suitable surveillance access points (Step 3), performing productive electronic surveillance by intercepting electronic packet messages via said interception devices (Step 4) and performing surveillance processing of intercepted packet messages to determine additional suitable access points (Step 5).

In a first exemplary embodiment of the invention, FIG. 4A depicts a managed VoP network (10), administered by a service provider, wherein an end-user device (11) (either a PC (11A) or a telephone (11B)) may place or receive packet-based telephone calls either within said network, or alternatively, through said network to a public switched telephone network (PSTN) (12). In the first embodiment, Step 1 of the inventive procedure (analysis of said network) reveals that user device 11 is connected to network 10 via a media gateway (13), an access network (14) and finally an edge router (15). Step 1 also reveals that network 10 further comprises the VoP-capable devices of a call server (16), an audio server (17) and a trunk gateway (31). Finally, the procedure reveals that the entire VoP network 10 is being managed by a network management system (18). Note that calls generally involve two or more parties with two or more end-user devices, gateways and access networks. These additional devices, gateways and networks are not shown for clarity.

The nature of the targeted end-user device 11 may or may not be known as a result of the Step 1 analysis. Similarly, the nature of any end-user encryption and whether or not NAT is in place may be unknown. Step 1 provides the first step of an iterative procedure for helping to determine these facts through surveillance.

Also as shown in FIG. 4A, the service provider for network 10 is obligated by the Communications Assistance for Law Enforcement Act (CALEA) to provide a known Delivery Function (DF) (19) within its network. The DF performs the services of intercepting without altering packets at network SAPs and then replicating and facilitating delivery of said packets to a known collection function (CF) utilizing Law Enforcement Agency Collection Equipment (LEC), collectively referred to as (CF/LEC) (20). Said LCE are voice signal call information (CI) and call message call content (CC) packet interception devices which are used to intercept CI and CC transmissions originating from and being routed to user device 11. The CF/LEC exist within the domain of and are under the control of a designated law enforcement agency (LEA).

As a result of the analysis of the network of the first embodiment performed during procedure Step 1 above, router 15 and call server 16 are identified as suitable SAPs during procedure Step 2. The precise nature of said Step 1 analysis and Step 2 SAP identification is beyond the scope of this discussion. Both steps are performed internal to the LEA in cooperation with said service provider. The network analysis and identification of SAPs is based on LEA assumptions regarding the nature and use of the targeted user device 11, the media gateway 13, the access network 14 and the physical and operational features of network 10.

In Step 3 of the procedure, router 15 and call server 16, collectively, exemplary SAP devices 15/16, are configured by the service provider as part of DF 19 to permit interface with CF/LCE 20. Once operational, the CF/LCE device operates in conjunction with said SAP devices to facilitate productive surveillance during Step 4 of the procedure.

In this embodiment, productive surveillance comprises intercepting VoP call set-up signals (CI) originating from user device 11 as early as possible during security association (SA) set up. FIG. 4B depicts a call flow for this exemplary embodiment. It begins with a call originating at a end-user device, shown as Customer Provided Equipment (CPE-A) (which in this example is end-user device 11), and involving a media gateway (MG-A) (which in this example is media gateway 13), an edge router (ER-A) (which in this example is router 15), the DF 19 and the CF/LCE 20, collectively shown as CF/LCE 20 in FIG. 4B, call server (CS) 16, another edge router (ER-B) (21), another media gateway (MG-B) (22) and another end-user device (CPE-B) (23).

As shown in FIG. 4B, the surveillance process begins when end-user device 11 goes "off-hook" (24). The DF, in association with the CF/LCE, requests call set-up information (CI) from call server 16. This is shown as CI Req (25). As digits (26) are entered, media gateway 13 places an invitation (27) to the call server 16. As call set up information (CI) is exchanged between the call server and the media gateway, that CI is replicated at the call server location and forwarded via the DF to CF/LCE 20 for analysis by the LEA. This is shown as RCI (28).

Call set-up information continues to transmit between the various network components until the VoP call is set up. At each involvement of call server 16, associated RCI is transmitted to CF/LCE 20. The nature of the RCI information received by the LEA during this process depends on the call set-up protocols at work, the encryption algorithm and the application, and is beyond the scope of this discussion. However, it is the intended that surveillance performed during this embodiment of the invention would intercept packets passing between MG-A 13 and MG-B 22 and call server 16 which contain information in the headers and data fields regarding who the message is going to and from as well as the IP address of any proxy servers being used. It is also an object of the surveillance that the encryption protocol and keys for the follow-on voice message (CC) stream, as may be contained in the early CI packet payloads, will be able to be intercepted and utilized to intercept and decrypt that voice message stream.

Once call set-up is complete, the DF, in association with the CF/LCE, requests call content (CC) from router 15. This is shown as CC Req (29). If previous Step 1 analysis has indicated that edge router 21 should be identified as a SAP, then the DF would make a CC Req (29') from that device as well. As the call transpires, the two edge router SAPs (15 and 21) replicate call content (CC) packets which are passed to the CF/LCE for analysis. This is shown as RCC (30 and 30')

Call content continues to transmit between the two end-user devices until the VoP call ends. At each involvement of edge routers 15 and 21, associated RCC is transmitted to CF/LCE 20 for analysis. The nature of the RCI information received by the LEA during this process depends on the call protocols at work, the encryption algorithm and the application, and is beyond the scope of this discussion. However, it is the intended that surveillance performed during this embodiment of the invention would intercept targeted end-user packets passing between edge routers 15 and 21 which contain information which is able to be decrypted by using the encryption protocol and key intercepted above and which leads to Step 5 of the procedure, better analysis of the end-user environment relative to network 10 and to better identification of suitable SAPs.

In a second exemplary embodiment of the invention, FIG. 5A depicts a managed VoP network (100), administered by a service provider, wherein an end-user device (111) (either a PC (111A) or a telephone (111B)) may place or receive packet-based telephone calls either within said network, or alternatively, through said network to a public switched telephone network (PSTN) (112). In the second embodiment, Step 1 of the inventive procedure (analysis of said network) reveals that user device 111 is connected to network 100 via a media gateway (113), an access network (114) and finally an edge router (115). Step 1 also reveals that network 100 further comprises the VoP-capable devices of a call server (116), a centralized media gateway (117) and a trunk gateway (131). Finally, the procedure reveals that the entire VoP network 100 is being managed by a network management system (118). Note that calls generally involve two or more parties with two or more end-user devices, gateways and access networks. These additional devices, gateways and networks are not shown for clarity.

The nature of the targeted end-user device 111 may or may not be known as a result of the Step 1 analysis. Similarly, the nature of any end-user encryption and whether or not NAT is in place may be unknown. Step 1 provides the first step of an iterative procedure for helping to determine these facts through surveillance.

Also as shown in FIG. 5A, the service provider for network 100 is obligated by the Communications Assistance for Law Enforcement Act (CALEA) to provide a known Delivery Function (DF) (119) within its network. The DF performs the services of intercepting without altering packets at network SAPs and then replicating and facilitating delivery of said packets to a known collection function (CF) utilizing Law Enforcement Agency Collection Equipment (LEC), collectively referred to as (CF/LEC) (120). Said LCE are voice signal call information (CI) and call message call content (CC) packet interception devices which are used to intercept CI and CC transmissions originating from and being routed to user device 111. The CF/LEC exist within the domain of and are under the control of a designated law enforcement agency (LEA).

As a result of the analysis of the network of the second embodiment performed during procedure Step 1 above, call server 116 and centralized media gateway 117 are identified as suitable SAPs during procedure Step 2. The precise nature of said Step 1 analysis and Step 2 SAP identification is beyond the scope of this discussion. Both steps are performed internal to the LEA in cooperation with said service provider. The network analysis and identification of SAPs is based on LEA assumptions regarding the nature and use of the targeted user device 111, the media gateway 113, the access network 114 and the physical and operational features of network 100.

In Step 3 of the procedure, call server 116 and centralized media gateway 117, collectively, exemplary SAP devices 116/117, are configured by the service provider as part of DF 119 to permit interface with CF/LCE 120. Once operational, the CF/LCE device operates in conjunction with said SAP devices to facilitate productive surveillance during Step 4 of the procedure.

In this second embodiment, productive surveillance comprises intercepting VoP call set-up signals (CI) originating from user device 111 as early as possible during security association (SA) set up. FIG. 5B depicts a call flow for this exemplary embodiment. It begins with a call originating at an end-user device, shown as Customer Provided Equipment (CPE-A) (which in this example is end-user device 111), and involving a media gateway (MG-A) (which in this example is media gateway 113), an edge router (ER-A) (which in this example is router 115), the centralized media gateway 117, the DF 119 and the CF/LCE 120, collectively shown as CF/LCE 120 in FIG. 5B, call server (CS) 116, another edge router (ER-B) (121), another media gateway (MG-B) (122) and another end-user device (CPE-B) (123).

As shown in FIG. 5B, the surveillance process begins when end-user device 111 goes "off-hook" (124). The DF, in association with the CF/LCE, requests call set-up information (CI) from call server 116. This is shown as CI Req (125). As digits (126) are entered, media gateway 113 places an invitation (127) to the call server 116. As call set up information (CI) is exchanged between the call server and the media gateway, that CI is replicated at the call server location and forwarded via the DF to CF/LCE 120 for analysis by the LEA. This is shown as RCI (128).

Call set-up information continues to transmit between the various network components until the VoP call is set up. At each involvement of call server 116, associated RCI is transmitted to CF/LCE 120. The nature of the RCI information received by the LEA during this process depends on the call set-up protocols at work, the encryption algorithm and the application, and is beyond the scope of this discussion. However, it is the intended that surveillance performed during this embodiment of the invention would intercept packets passing between MG-A 113 and MG-B 122 and call server 116 which contain information in the headers and data fields regarding who the message is going to and from as well as the IP address of any proxy servers being used. It is also an object of the surveillance that the encryption protocol and keys for the follow-on voice message (CC) stream, as may be contained in the early CI packet payloads, will be able to be intercepted and utilized to intercept and decrypt that voice message stream.

Once call set-up is complete, the DF, in association with the CF/LCE, requests call content (CC) from centralized media gateway 117. This is shown as CC Req (129). As the call transpires, the centralized media gateway replicates call content (CC) packets which are passed to the CF/LCE for analysis. This is shown as RCC (130)

Call content continues to transmit between the two end-user devices until the VoP call ends. At each involvement of centralized media gateway 117, associated RCC is transmitted to CF/LCE 120. The nature of the RCC information received by the LEA during this process depends on the call protocols at work, the encryption algorithm and the application, and is beyond the scope of this discussion. However, it is the intended that surveillance performed during this embodiment of the invention would intercept targeted end-user packets passing between edge routers 115 and 121 which contain information which is able to be decrypted by using the encryption protocol and key intercepted above and which leads to Step 5 of the procedure, better analysis of the end-user environment relative to network 100 and to better identification of suitable SAPs.

In a third exemplary embodiment of the invention, FIG. 6A depicts a managed VoP network (200), administered by a service provider, wherein an end-user device (211) (either a PC (211A) or a telephone (211B)) may place or receive packet-based telephone calls either within said network, or alternatively, through said network to a public switched telephone network (PSTN) (212). In the second embodiment, Step 1 of the inventive procedure (analysis of said network) reveals that user device 211 is connected to network 200 via a media gateway (213), an access network (214) and finally an edge router (215). Step 1 also reveals that network 200 further comprises the VoP-capable devices of a call server (216), an audio server (217) and a trunk gateway (231). Finally, the procedure reveals that the entire VoP network 200 is being managed by a network management system (218). Note that calls generally involve two or more parties with two or more end-user devices, gateways and access networks. These additional devices, gateways and networks are not shown for clarity.

The nature of the targeted end-user device 211 may or may not be known as a result of the Step 1 analysis. Similarly, the nature of any end-user encryption and whether or not NAT is in place may be unknown. Step 1 provides the first step of an iterative procedure for helping to determine these facts through surveillance.

Also as shown in FIG. 6A, the service provider for network 100 is obligated by the Communications Assistance for Law Enforcement Act (CALEA) to provide a known Delivery Function (DF) (219) within its network. The DF performs the services of intercepting without altering packets at network SAPs and then replicating and facilitating delivery of said packets to a known collection function (CF) utilizing Law Enforcement Agency Collection Equipment (LEC), collectively referred to as (CF/LEC) (220). Said LCE are voice signal call information (CI) and call message call content (CC) packet interception devices which are used to intercept CI and CC transmissions originating from and being routed to user device 211. The CF/LEC exist within the domain of and are under the control of a designated law enforcement agency (LEA).

As a result of the analysis of the network of the third embodiment performed during procedure Step 1 above, media gateway 213 and call server 216 are identified as suitable SAPs during procedure Step 2. The precise nature of said Step 1 analysis and Step 2 SAP identification is beyond the scope of this discussion. Both steps are performed internal to the LEA in cooperation with said service provider. The network analysis and identification of SAPs is based on LEA assumptions regarding the nature and use of the targeted user device 211, the media gateway 213, the access network 214 and the physical and operational features of network 200.

In Step 3 of the procedure, media gateway 213 and call server 216, collectively, exemplary SAP devices 213/216, are configured by the service provider as part of DF 219 to permit interface with CF/LCE 220. In this embodiment, configuration of the media gateway, which may physically exist on the end-user's premises, would have to occur via factory-installed hardware or software (presumably government regulated in alliance with CALEA) or it would have to occur via a configuration software sent to the media gateway by the service provider, or it could be a combination of the above. Once operational, the CF/LCE device operates in conjunction with said SAP devices to facilitate productive surveillance during Step 4 of the procedure.

In this third embodiment, productive surveillance comprises intercepting VoP call set-up signals (CI) originating from user device 211 as early as possible during security association (SA) set up. FIG. 6B depicts a call flow for this exemplary embodiment. It begins with a call originating at an end-user device, shown as Customer Provided Equipment (CPE-A) (which in this example is end-user device 211), and involving a media gateway (MG-A) (which in this example is media gateway 213), an edge router (ER-A) (which in this example is router 215), the DF 219 and the CF/LCE 220, collectively shown as CF/LCE 220 in FIG. 6B, call server (CS) 216, another edge router (ER-B) (221), another media gateway (MG-B) (222) and another end-user device (CPE-B) (223).

As shown in FIG. 6B, the surveillance process begins when end-user device 211 goes "off-hook" (224). The DF, in association with the CF/LCE, requests call set-up information (CI) from call server 216. This is shown as CI Req (225). As digits (226) are entered, media gateway 213 places an invitation (227) to the call server 216. As call set up information (CI) is exchanged between the call server and the media gateway, that CI is replicated at the call server location and forwarded via the DF to CF/LCE 220 for analysis by the LEA. This is shown as RCI (228).

Call set-up information continues to transmit between the various network components until the VoP call is set up. At each involvement of call server 216, associated RCI is transmitted to CF/LCE 220. The nature of the RCI information received by the LEA during this process depends on the call set-up protocols at work, the encryption algorithm and the application, and is beyond the scope of this discussion. However, it is the intended that surveillance performed during this embodiment of the invention would intercept packets passing between MG-A 213 and MG-B 222 and call server 216 which contain information in the headers and data fields regarding who the message is going to and from as well as the IP address of any proxy servers being used. It is also an object of the surveillance that the encryption protocol and keys for the follow-on voice message (CC) stream, as may be contained in the early CI packet payloads, will be able to be intercepted and utilized to intercept and decrypt that voice message stream.

Once call set-up is complete, the DF, in association with the CF/LCE, requests call content (CC) from media gateway 213. This is shown as CC Req (229). If previous Step 1 analysis has indicated that media gateway 222 should be identified as a SAP, then the DF would make a CC Req (229') from that device as well. As the call transpires, media gateways 213 and 222 replicate call content (CC) packets which are passed to the CF/LCE for analysis. This is shown as RCC (230 and 230')

Call content continues to transmit between the two end-user devices until the VoP call ends. At each involvement of either media gateway 213 and 222, associated RCC is transmitted to CF/LCE 220. The nature of the RCC information received by the LEA during this process depends on the call protocols at work, the encryption algorithm and the application, and is beyond the scope of this discussion. However, it is the intended that surveillance performed during this embodiment of the invention would intercept targeted end-user packets passing between media gateways 213 and 222 which contain information which is able to be decrypted by using the encryption protocol and key intercepted above and which leads to Step 5 of the procedure, better analysis of the end-user environment relative to network 200 and to better identification of suitable SAPs.

The fourth exemplary embodiment is very similar to the first embodiment, with the exception that if a VoP caller is calling to an end-user within the PSTN, analysis of the network would reveal that trunk gateway 31 should also be identified as a SAP. FIG. 7A depicts the network 10 of the first embodiment with trunk gateway 31 so identified. In this embodiment, because the trunk gateway usually does not participate in call processing, edge routers 15 and 21 may remain as SAPs. In addition, a PSTN Class 5 switch that controls the call channels linking to the trunk gateway (not shown) may be added as a SAP.

As shown again in FIG. 7B, call set-up proceeds as in the first exemplary embodiment until complete. Requests for call content (CC Req) would then be made from DF 19 to both trunk gateway 31 and edge router 21 (CC Reqs 329 and 329', respectively).

As the call transpires, media gateways 13 and 22, trunk gateway 31 and the Class 5 switch all replicate call content (CC) packets which are passed to the CF/LCE for analysis. This is shown as RCC (330 and 330'—RCC for the class 5 switch is omitted for clarity).

Finally, FIG. 8A depicts a fifth exemplary embodiment of the invention in which Step 1 analysis has shown a general VoP network with edge routers (415 and 415'), with DF (419) and external CF/LCE (420). End-user Session Initiation Protocol-capable internet protocol telephones (411 and 411') are operating across the network in a peer-to-peer arrangement. In this embodiment, there is no call server, since packets are routed directly between end-users by the routers.

The routers are chosen as the SAPs in Step 2 to which CF/LCE devices are operatively connected in Step 3. Call flows for this arrangement are shown in FIG. 8B. As with the previous embodiments, the productive surveillance of Step 4 comprises attempting to intercept VoP call packets early in the call, during security association negotiation between the two end-users. During the initial stages of the call, the DF initiates CI requests (CI Req) (425 and 425') to both edge routers. Then as the remainder of the call is set-up, RCI is relayed from the two edge routers back to the CF/LCE. Once the two-way trip is established between the end-users, the routers will be able to transmit RCC from the routers back to the CF/LCE. If, during call set-up, the LEA has been able to ascertain the sender and receiver's addresses and the nature of the encryption and keys, it will be able to process the intercepted CC packets for productive surveillance.

Although the exemplary embodiments are illustrated with very limiting set of network features, many different net can be used without departing from the scope of the invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A method of electronic surveillance in a network comprising the steps of:
   analyzing said network, relative to one or a plurality of targeted devices, to identify one or a plurality of access points for electronic signal interception as surveillance access points based on the system configuration and operation parameters of said network, said network being a voice over packet (VoP) network, wherein said analyzing comprises:
      inserting, at one or a plurality of candidate access points, into packet messages being forwarded in the network, an IP address assigned to the candidate access points into the optional router header as router information for identifying the candidate access points closest to the targeted devices as said surveillance access points, when there is no router information in the packet messages as received at the candidate access points;
   operatively connecting interception devices to said network at said surveillance access points;
   performing electronic surveillance by intercepting electronic packet messages at the surveillance access points via said interception devices, wherein said packet messages comprise one of configuration files, security association messages, call management signals and associated call contents, and wherein said intercepting comprises:
      receiving packet messages with VoP call set-up signals indicating who the message is going to and originating from one of the targeted devices during security association set up and transmitting replications of the packet messages with call set-up signals to one or a plurality of processing devices for surveillance processing;
      after call set-up is complete, receiving a request for call content from the one or a plurality of processing devices;
      after receiving the request for call content and until the VoP call ends, receiving without altering said packet messages, and transmitting replications of said packet messages when they belong to the VoP call to the one or a plurality of processing devices for surveillance processing;
   performing surveillance processing of intercepted packet messages to determine additional said surveillance access points and decrypting said packet messages.

2. The method of claim 1 wherein said network comprises a provider-managed, packet-switched, electronic signal transmission facility being utilized in a transport mode by said targeted devices for voice-over-packet (VoP) transmission under conditions of end-to-end encryption by said targeted devices and one of network address translation (NAT) and Dynamic Host Configuration Protocol (DCHP) for mapping private local area network (LAN) addresses to public internet addresses.

3. The method of claim 1 wherein said network comprises a provider-managed, packet-switched, electronic signal transmission facility being utilized in a tunnel mode by said targeted devices for voice-over-packet (VoP) transmission under conditions of end-to-end encryption by said targeted devices and one of network address translation (NAT) and Dynamic Host Configuration Protocol (DCHP) for mapping private local area network (LAN) addresses to public internet addresses.

4. The method of claim 1 wherein said network comprises a provider-managed, packet-switched, electronic signal transmission facility being utilized in a clear mode by said targeted devices for voice-over-packet (VoP) transmission under conditions of no end-to-end encryption by said targeted devices.

5. The method of claim 1 wherein said targeted devices comprise one of end-user internet protocol (IP) telephones, plain old telephone system (POTS) telephones operating through gateways and personal computers transmitting voiceover-packet (VoP) signals across said network via one of a transport mode, tunnel mode and clear mode and which are the object of said electronic surveillance.

6. The method of claim 1 wherein said surveillance access points comprise physical locations on said network where said intercepting devices may be operatively connected for said electronic surveillance.

7. The method of claim 1 wherein said interception devices comprise electronic signal handling devices which are able to:
   read electronic signals passing by said surveillance access points, without alteration of said signals; and to
   transmit replications of said signals to said processing device.

8. The method of claim 1 wherein said electronic surveillance comprises intercepting said call management signals as security association parameters are being negotiated between a said targeted device and another device during an associated call set-up such that negotiated ports of origination and destination for the transmission of said associated call contents together with the protocol in which said ports are specified may be ascertained from said call management signals.

9. The method of claim 1 wherein said electronic surveillance comprises intercepting said packet messages within and with the cooperation of address translation (AT) devices which perform network address translation (NAT), wherever they exist on said network relative to said targeted devices, such that said AT devices are able to provide to said interception devices security keys supplied by said targeted devices to said AT devices for use by said AT devices to decrypt said packet messages, and to provide to said interception devices said targeted devices' private LAN addresses as translated from their NAT-assigned public internet address.

10. The method of claim 1 wherein said electronic surveillance comprises intercepting said packet messages between said target devices and first branch points in said network, wherein said first branch points allow said packet messages to take different paths through said network, wherever "Dynamic Host Configuration Protocol (DHCP)" is being utilized in lieu of network address translation (NAT) to assign public internet addresses to private local area network (LAN) addresses of said targeted devices.

11. The method of claim 10 wherein said branch points comprise a cable modem termination system (CMTS) when said network is cable-provider based.

12. The method of claim 1 wherein said configuration files comprise one of encryption key certificates and encryption keys and encryption protocols negotiated between said targeted devices and a configuration server created during the start-up stage of said targeted devices.

13. The method of claim 1 wherein said security association messages comprise authentication and encryption keys, protocols and parameters that will be used to encrypt signaling messages as negotiated between call servers and said targeted devices.

14. The method of claim 1 wherein said call management signals comprise electronic messages sent between a said targeted device and one of a network call server and proxy server for the purposes of voice-over-packet (VOP) call set-up, and wherein ports of origination and destination for all pending said associated call contents are identified together with the protocol in which said ports are specified.

15. The method of claim 1 wherein said call management signals comprise electronic media authentication and encryption keys, protocols and methods sent between two said targeted devices through a call server.

16. The method of claim 1 wherein said associated call contents comprise the encrypted voice content of a voice-over-packet (VoP) call for which said call management signals have been generated.

17. The method of claim 1 wherein said security association messages comprise packets sent between two said targeted devices wherein said packets contain private information related to a security association between said two said targeted devices enabling call contents to be exchanged using a specific protocol wherein said private information related to a security association will determine the authentication and encryption keys, protocols and parameters to be used in communication between said two said targeted devices.

18. The method of claim 1 wherein said processing devices are equipped to support a wide variety of transmission protocols, security protocols, encryption methods and their associated parameters.

19. The method of claim 1 wherein said processing devices are equipped with fast processors to perform encryption when said targeted devices are using hardware for encryption.

20. The method of claim 1 wherein said surveillance processing comprises analyzing said packet messages, intercepted during said electronic surveillance, wherein said analyzing comprises deciphering for content and meaning for surveillance purposes, said call management signals and said associated call contents for the purposes of obtaining one or a plurality of:
   the identity of users of said targeted devices;
   the location of said targeted devices;
   the intended destination of messages sent from said targeted devices; the origination location of incoming messages to said targeted devices; and
   other details of messages sent and received by said targeted devices.

* * * * *

UNITED STATES PATENT AND TRADEMARK OFFICE
CERTIFICATE OF CORRECTION

PATENT NO. : 7,587,757 B2  Page 1 of 1
APPLICATION NO. : 11/054969
DATED : September 8, 2009
INVENTOR(S) : Scoggins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1219 days.

Signed and Sealed this

Twenty-first Day of September, 2010

David J. Kappos
*Director of the United States Patent and Trademark Office*